United States Patent
Naito

(10) Patent No.: US 11,946,765 B2
(45) Date of Patent: Apr. 2, 2024

(54) INFORMATION PROCESSING APPARATUS, INFORMATION PROCESSING SYSTEM, INFORMATION PROCESSING METHOD, AND NON-TRANSITORY STORAGE MEDIUM

(71) Applicant: MICWARE CO., LTD., Kobe (JP)

(72) Inventor: Kazuma Naito, Kobe (JP)

(73) Assignee: MICWARE CO., LTD., Kobe (JP)

( * ) Notice: Subject to any disclaimer, the term of this patent is extended or adjusted under 35 U.S.C. 154(b) by 84 days.

(21) Appl. No.: 17/344,225

(22) Filed: Jun. 10, 2021

(65) Prior Publication Data

US 2021/0404838 A1 Dec. 30, 2021

(30) Foreign Application Priority Data

Jun. 24, 2020 (JP) .................. 2020-108708
May 28, 2021 (JP) .................. 2021-089781

(51) Int. Cl.
*G01C 21/36* (2006.01)
*B60L 58/12* (2019.01)
*G01C 21/34* (2006.01)

(52) U.S. Cl.
CPC ......... *G01C 21/3679* (2013.01); *B60L 58/12* (2019.02); *G01C 21/3469* (2013.01); *G01C 21/3667* (2013.01)

(58) Field of Classification Search
CPC ........... G01C 21/3679; G01C 21/3469; G01C 21/3667; G01C 21/3617; B60L 58/12; B60L 53/60; Y02T 10/70; Y02T 10/7072; Y02T 90/12; Y02T 90/16
See application file for complete search history.

(56) References Cited

U.S. PATENT DOCUMENTS

| 2013/0031121 | A1 | 1/2013 | Sera et al. |
| 2013/0151293 | A1* | 6/2013 | Karner .................... B60L 53/68 705/5 |
| 2013/0218458 | A1* | 8/2013 | Scholl ................ G01C 21/3697 701/461 |
| 2014/0214321 | A1 | 7/2014 | Kawamata et al. |
| 2017/0217319 | A1 | 8/2017 | Araki |

(Continued)

FOREIGN PATENT DOCUMENTS

| JP | 2019-215648 A | | 12/2019 |
| KR | 20160098766 | * | 8/2016 |
| WO | WO 2013/024521 A1 | | 2/2013 |

OTHER PUBLICATIONS

Extended European Search Report for European Application No. 21178642.1, dated Nov. 11, 2021.

*Primary Examiner* — Vivek D Koppikar
*Assistant Examiner* — Godfrey Aleksander Maciorowski
(74) *Attorney, Agent, or Firm* — Birch, Stewart, Kolasch & Birch, LLP

(57) ABSTRACT

An information processing apparatus includes a map information storage, a charging record information storage, and a processor. The map information storage is configured to store map information including a location of a charging station to charge a battery of an electric vehicle. The charging record information storage is configured to store charging record information indicating whether or not it has been possible to charge the battery. The processor is programed to calculate an evaluation value based on the charging record information.

6 Claims, 15 Drawing Sheets

(56) References Cited

U.S. PATENT DOCUMENTS

2017/0356751 A1* 12/2017 Lagnemma .......... G05D 1/0214
2018/0202825 A1    7/2018 You et al.
2019/0275892 A1*  9/2019 Williams ................ B60L 58/12
2019/0383637 A1* 12/2019 Teske ...................... B60L 53/65

* cited by examiner

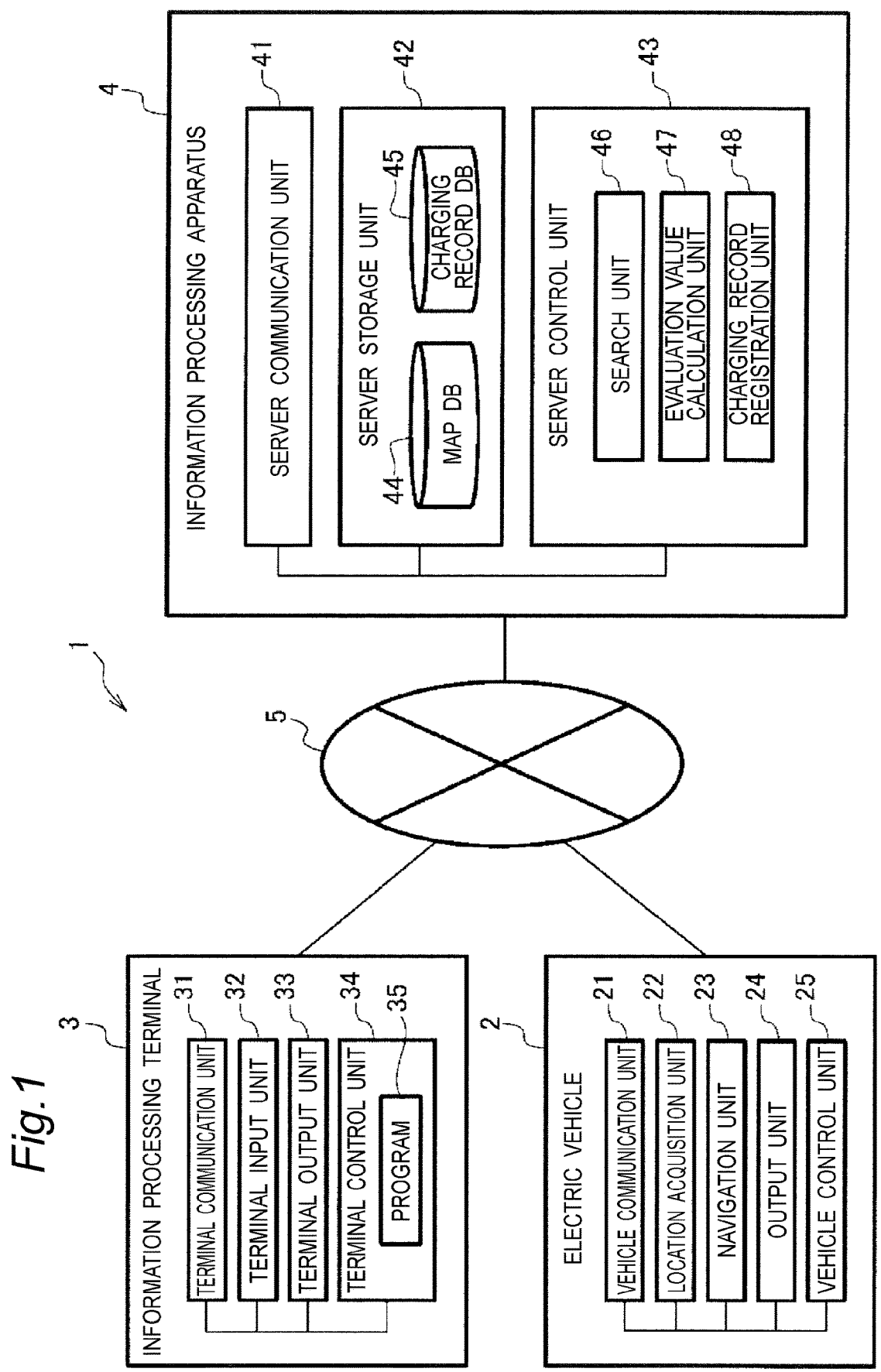

Fig.2A

CHARGING STATION INFORMATION STORED IN MAP DB

| STATION ID | LOCATION (LATITUDE, LONGITUDE) | CHARGING STANDARD |
|---|---|---|

Fig.2B

CHARGING RECORD INFORMATION

| REGISTRATION DATE AND TIME | LOCATION (LATITUDE, LONGITUDE) |
|---|---|

Fig.2C

CHARGING STATION INFORMATION INCLUDING EVALUATION VALUE

| STATION ID | LOCATION (LATITUDE, LONGITUDE) | CHARGING STANDARD | EVALUATION VALUE |
|---|---|---|---|

| REGISTRATION DATE AND TIME | LATITUDE | LONGITUDE |
|---|---|---|
| 202003071111 | Lon1 | Lat1 |
| 202005022222 | Lon2 | Lat2 |
| 202006041111 | Lon3 | Lat3 |
| 202007022222 | Lon4 | Lat4 |

NARROW DOWN EVALUATION PERIOD

| REGISTRATION DATE AND TIME | LATITUDE | LONGITUDE |
|---|---|---|
| 202005022222 | Lon2 | Lat2 |
| 202006041111 | Lon3 | Lat3 |
| 202007022222 | Lon4 | Lat4 |

INFORMATION PROCESSING APPARATUS,
INFORMATION PROCESSING SYSTEM,
INFORMATION PROCESSING METHOD,
AND NON-TRANSITORY STORAGE
MEDIUM

CROSS REFERENCE TO RELATED
APPLICATIONS

The present application claims priority under 35 U.S.C. § 119 to Japanese Patent Application No. 2020-108708, filed Jun. 24, 2020, entitled "INFORMATION PROCESSING APPARATUS, INFORMATION PROCESSING SYSTEM, INFORMATION PROCESSING METHOD, AND INFORMATION PROCESSING PROGRAM" and Japanese Patent Application No. 2021-089781, filed May 28, 2021, entitled "INFORMATION PROCESSING APPARATUS, INFORMATION PROCESSING SYSTEM, INFORMATION PROCESSING METHOD, AND INFORMATION PROCESSING PROGRAM." The contents of these applications are incorporated herein by reference in their entirety.

BACKGROUND OF THE INVENTION

Field of the Invention

The present invention relates to an information processing apparatus, an information processing system, an information processing method, and an information processing program.

Description of the Related Art

In recent years, an electric vehicle that travels using electric energy stored in a battery as the power of a vehicle has rapidly spread. Examples of the electric vehicle include a hybrid car and an electric car. In an electric vehicle, there is known a technique of displaying a location of a charging station for charging a battery on a map of a navigation device at the time of charging.

As this type of information processing apparatus, for example, WO 2013/024521 A discloses a charging information providing apparatus that displays the location of a charging station for charging an electric vehicle on a map (WO 2013/024521 A).

In addition, although not a charging station for charging an electric vehicle, for example, JP 2019-215648 A discloses an information processing apparatus that acquires state information indicating a state of each apparatus from a plurality of apparatuses and displays a map indicating an arrangement position of an apparatus reflecting the acquired state information (JP 2019-215648 A).

SUMMARY OF THE INVENTION

According to one aspect of the present invention, an information processing apparatus includes a map information storage, a charging record information storage, and a processor. The map information storage is configured to store map information including a location of a charging station to charge a battery of an electric vehicle. The charging record information storage is configured to store charging record information indicating whether or not it has been possible to charge the battery. The processor is programed to calculate an evaluation value based on the charging record information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a schematic configuration diagram of an information processing system according to a first embodiment.

FIG. 2A is a schematic diagram showing a configuration of charging station information stored in a map DB of the information processing system according to the first embodiment.

FIG. 2B is a schematic diagram showing a configuration of charging record information stored in a charging record DB of the information processing system according to the first embodiment.

FIG. 2C is a schematic diagram showing a configuration of charging record information to which an evaluation value is assigned in the information processing system according to the first embodiment.

DESCRIPTION OF THE EMBODIMENTS

Figure 3:
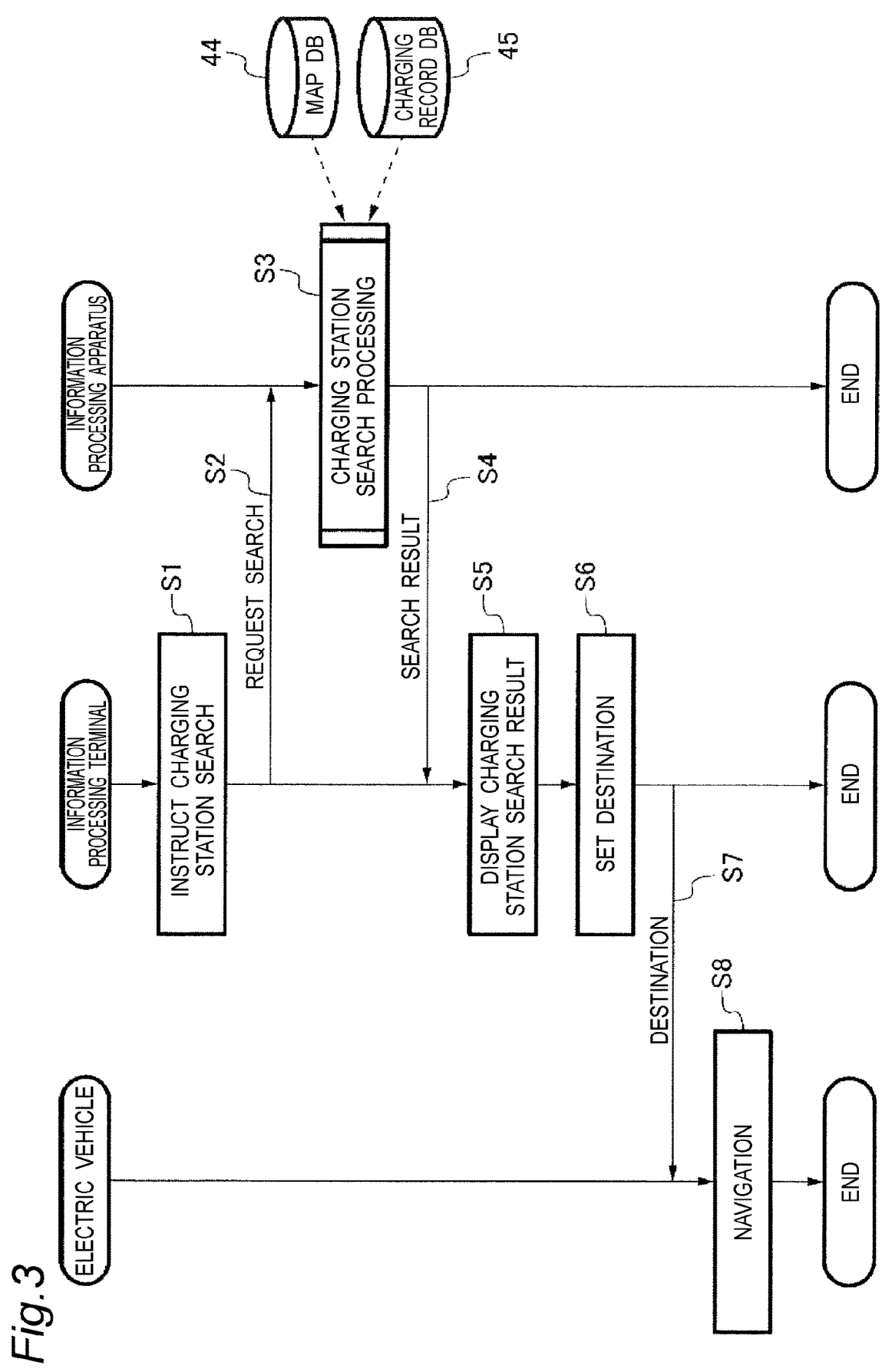
FIG. 3 is a flowchart showing a flow of processing between an electric vehicle, an information processing terminal, and an information processing apparatus when a search for a charging station is performed in the information processing system according to the first embodiment.

The embodiments will now be described with reference to the accompanying drawings, wherein like reference numerals designate corresponding or identical elements throughout the various drawings.

First Embodiment

<Configuration of Information Processing System 1>

FIG. 1 is a schematic configuration diagram of an information processing system 1 according to a first embodiment. The information processing system 1 is configured such that an information processing apparatus 4 provides information regarding a charging station capable of performing charging to an information processing terminal 3 carried by a driver of an electric vehicle 2. Hereinafter, the information regarding the charging station is also referred to as charging station information. The charging station is a facility provided with a charging device that charges a battery of the electric vehicle 2. As shown in FIG. 1, the information processing system 1 includes, for example, the electric vehicle 2, the information processing terminal 3, and the information processing apparatus 4. The electric vehicle 2 travels using electric power stored in the battery of the electric vehicle 2. The electric vehicle 2 includes, for example, an electric vehicle (EV) and a hybrid electric vehicle (HEV). The information processing terminal 3 includes, for example, a smartphone, a tablet terminal, or a laptop. The information processing apparatus 4 provides the information processing terminal 3 with information on a charging station capable of charging the electric vehicle 2. The information processing apparatus 4 includes, for example, a server. The information processing terminal 3 and the information processing apparatus 4 are configured to be able to communicate with each other via a communication network 5. The information processing terminal 3 is configured to be able to communicate with the electric vehicle 2 via the communication network 5. The information processing apparatus 4 is configured to be able to communicate with the electric vehicle 2 via the communication network 5. The communication network 5 is a wireless communication network. The communication network 5 includes, for example, a public network, an Internet network, a dedicated communication network, a WiFi (registered trademark) network, and a near field communication network. Communication between the electric vehicle 2 and the information processing terminal 3 and communication between the information processing terminal 3 and the information processing apparatus 4 may be made via the same communication network 5. Communication between the electric vehicle 2 and the information processing terminal 3 and communication between the information processing terminal 3 and the information processing apparatus 4 may be made via different communication networks 5.

Electric Vehicle 2

The electric vehicle 2 includes a vehicle communication unit 21, a location acquisition unit 22, a navigation unit 23, an output unit 24, and a vehicle control unit 25.

The vehicle communication unit 21 is configured to be able to mutually communicate with the information processing terminal 3. When mutually communicating with the information processing terminal 3, the vehicle communication unit 21 can perform communication using, for example, a near field communication network. The vehicle communication unit 21 is configured to be able to mutually communicate with the information processing apparatus 4. When mutually communicating with the information processing apparatus 4, the vehicle communication unit 21 can perform communication using a public network, for example. The vehicle communication unit 21 is configured to appropriately transmit information regarding the electric vehicle 2 to the information processing apparatus 4. The term "appropriately" means, for example, a predetermined time interval and a predetermined trigger. In the present embodiment, the vehicle communication unit 21 transmits information regarding the electric vehicle 2 to the information processing apparatus 4 at a predetermined time interval or when an ACC power supply of the electric vehicle 2 is turned on from off. Hereinafter, the information regarding the electric vehicle 2 is also referred to as vehicle information. The vehicle information includes, for example, the location of the electric vehicle 2, the charge amount of the battery of the electric vehicle 2, and the navigable distance of the electric vehicle 2. The vehicle communication unit 21 is configured to receive charging station information from the information processing terminal 3. The charging station information is set as a navigation destination in the information processing terminal 3. The charging station information is, for example, information including the location of the charging station. The location of the charging station includes, for example, latitude and longitude. The location of the charging station may include altitude in addition to the latitude and longitude.

The location acquisition unit 22 is configured to acquire the current location of the electric vehicle 2 based on, for example, a radio wave received from a global navigation satellite system (GNSS). The location of the electric vehicle 2 includes, for example, latitude and longitude. The location of the electric vehicle 2 may include, for example, altitude in addition to the latitude and longitude. The location acquisition unit 22 can use a GNSS module as a sensor that receives a radio wave received from the GNSS to specify the location, for example. When acquiring the location of the electric vehicle 2, the GNSS module may acquire a time indicating the acquired time in addition to the latitude and longitude.

The navigation unit 23 functions as a part of a navigation device. The navigation unit 23 includes map information. The navigation unit 23 searches for a route to a destination based on map information. The navigation unit 23 is configured to output information regarding a map and route guidance to the output unit 24. The navigation device may include the vehicle communication unit 21, the location acquisition unit 22, the navigation unit 23, and the output unit 24.

The output unit 24 is an interface that outputs information regarding the position of the electric vehicle 2, a map, and route guidance to a destination. The output unit 24 includes, for example, a display and a speaker. Examples of the display include a liquid crystal display device and an electro luminescence (EL) display device.

The vehicle control unit 25 is configured to control the drive of the electric vehicle 2 using the electric power stored in the battery.

Information Processing Terminal 3

Hereinafter, the information processing terminal 3 will be described as the information processing terminal 3 carried by the driver of the electric vehicle 2, but when there is a fellow passenger in the electric vehicle 2, the information processing terminal 3 may be described as the information processing terminal 3 carried by the fellow passenger.

The information processing terminal 3 includes a terminal communication unit 31, a terminal input unit 32, a terminal output unit 33, and a terminal control unit 34.

The terminal communication unit 31 is configured to be able to mutually communicate with the electric vehicle 2. In addition, the terminal communication unit 31 is configured to be able to mutually communicate with the information processing apparatus 4. The terminal communication unit 31 is configured to transmit a search request for a charging station to the information processing apparatus 4. The terminal communication unit 31 is configured to receive the search result of the charging station from the information processing apparatus 4. The terminal communication unit 31 is configured to transmit charging station information regarding the charging station set as the navigation destination in the information processing terminal 3 to the electric vehicle 2.

The terminal input unit 32 is an interface for inputting a search condition for a charging station to the information processing apparatus 4. The terminal input unit 32 includes, for example, a touch panel. The search condition for the charging station is, for example, a condition regarding a region.

The terminal output unit 33 is an interface that outputs information regarding the search result of the charging station transmitted from the information processing apparatus 4. Hereinafter, the information regarding the search result of the charging station is also referred to as result information. The terminal output unit 33 includes, for example, a display. Examples of the display include a liquid crystal display device and an electro luminescence (EL) display device.

The terminal control unit 34 includes, for example, a read only memory (ROM), a read access memory (RAM), and a central processing unit (CPU). The terminal control unit 34 stores a program 35 for using the information processing system 1.

By executing the program 35, the terminal control unit 34 executes processing on the information processing terminal 3 side of the search processing regarding the charging station. Specifically, the terminal control unit 34 can perform control regarding the input of a search condition for a charging station on the information processing apparatus 4. The terminal control unit 34 can perform control regarding the display of the search result indicated by the result information received from the information processing apparatus 4.

By executing the program 35, the terminal control unit 34 can perform control of transmitting charging station information regarding the charging station set as the navigation destination to the electric vehicle 2.

It should be noted that although not shown, the information processing terminal 3 is configured to be able to acquire location information indicating the current location of the information processing terminal 3. The information processing terminal 3 is provided with, for example, a GNSS module. The location of the information processing terminal 3 includes, for example, latitude and longitude. The location of the information processing terminal 3 may include altitude in addition to the latitude and longitude.

Information Processing Apparatus 4

The information processing apparatus 4 includes a server communication unit 41, a server storage unit 42, and a server control unit 43.

The server communication unit 41 is configured to be able to mutually communicate with the electric vehicle 2. In addition, the server communication unit 41 is configured to be able to mutually communicate with the information processing terminal 3. The server communication unit 41 is configured to appropriately receive vehicle information from the electric vehicle 2. The server communication unit 41 may be configured to receive the vehicle information from the electric vehicle 2 via the information processing terminal 3. The server communication unit 41 is configured to receive a search request for a charging station from the information processing terminal 3. The server communication unit 41 is configured to transmit the search result of the charging station to the information processing terminal 3. In addition, the server communication unit 41 is configured to transmit the evaluation value of the charging station to the information processing terminal 3. The server communication unit 41 includes a transmission unit and a receiving unit. In other words, the transmission unit can be said to be an evaluation value output unit that outputs the evaluation value of the charging station. In addition, the receiving unit can also be said to be an acquisition unit that acquires a search request for a charging station.

The server storage unit 42 includes, for example, a read only memory (ROM), a read access memory (RAM), or a hard disk unit (HDD). The server storage unit 42 includes a map database 44 and a charging record database 45. Hereinafter, a database may be abbreviated as DB.

The map DB 44 is a database that stores map information. Here, the map information is configured to include data on nodes. The data on a node is, for example, location information indicating the location of the node and attribute information indicating an attribute of the node. In the present embodiment, the charging station information is configured to be stored as data on the node. Therefore, it can be said that the charging station information is stored in the map DB 44.

For example, as shown in FIG. 2A, the charging station information has a data configuration including a station ID, a location, and a charging standard. The station ID is information that can uniquely identify the charging station. The location is a place where the charging station is installed. The location of the charging station information includes, for example, latitude and longitude. The position of the charging station information may include altitude in addition to the latitude and longitude. The location of the charging station information is set to, for example, the center location of a facility. The charging standard is a system of a charging standard. The charging standard includes, for example, standards related to a plug shape for charging, a voltage, a current, a power distribution method, or a control mechanism. The standard related to the control mechanism may include, for example, information indicating rapid charging or normal charging. The standard regarding the control mechanism may include, for example, information indicating a communication method when the electric vehicle 2 and the charging station communicate with each other.

The charging record DB 45 is a database that stores charging record information. The charging record information is information registered when the electric vehicle 2 can be charged. That is, the charging record information is information registered when the charging device provided in the charging station has not failed. In other words, the charging record information can also be said to be history information indicating that charging was available in the past.

Next, a data configuration of the charging record information to be stored in the charging record DB 45 is shown in FIG. 2B. The charging record information includes, for example, a registration date and time and a location. The registration date and time is the date and time when the charging record information is registered in the charging record DB 45. Specifically, the registration date and time is the date and time when the information processing apparatus 4 determined that the battery was charged based on the vehicle information uploaded from the electric vehicle 2. The location is, for example, a location of the electric vehicle 2 included in the uploaded vehicle information.

The server storage unit 42 stores a program for executing each function of the server control unit 43 of the information processing apparatus 4. The program is stored in, for example, a storage device including a read only memory (ROM), a read access memory (RAM), or a hard disk unit (HDD) of the information processing apparatus 4. The program may be recorded not only in the storage device but also in a computer-readable recording medium. Examples of the computer-readable recording medium include a hard disk, a flexible disk, a compact disc read only memory (CD-ROM), a magneto optical disk (MO), and a digital versatile disc read only memory (DVD-ROM). The program to be executed in the information processing apparatus 4 may be delivered via the communication network 5.

The server control unit 43 includes, for example, a central processing unit (CPU). The server control unit 43 functionally includes a search unit 46, an evaluation value calculation unit 47, and a charging record registration unit 48.

The search unit 46 has a function of executing search processing in response to a search request for a charging station from the information processing terminal 3. The search unit 46 has a function of outputting a search result. The search request includes, for example, a search condition regarding a region. The search result is the charging station information and the charging record information that meet the search condition. The charging station information can be acquired from the map DB 44. The charging record information can be acquired from the charging record DB 45.

The evaluation value calculation unit 47 has a function of calculating an evaluation value of the charging station based on the charging record information included in the search result of the search unit 46. The evaluation value is an index indicating whether or not the charging station can perform charging at the present time. In other words, the evaluation value represents an evaluation obtained by estimating from the charging record in the past whether or not the charging station can perform charging without failure. For example, the evaluation value calculation unit 47 may be configured to express the evaluation value as a numerical value. In this case, the evaluation value calculation unit 47 may set the evaluation value such that the possibility of charging increases as the numerical value of the evaluation value increases. In addition, the evaluation value calculation unit 47 may be configured to be able to express the evaluation value with the number of star marks, for example. In this case, the evaluation value calculation unit 47 may set the evaluation value such that the possibility of charging increases as the number of star marks increases. For example, the evaluation value calculation unit 47 may calculate the evaluation value of the charging station based on the cumulative number in the most recent certain period of the charging record information corresponding to the charging station having been the calculation target of the evaluation value. Here, the most recent certain period may be, for example, a period from the present to three months before. In this case, the evaluation value calculation unit 47 extracts only the charging record information in the period from the present to three months before and calculates the evaluation value.

Next, FIG. 2C shows a data configuration of the charging station information to which the evaluation value is assigned. The charging station information to which the evaluation value is assigned is transmitted from the server communication unit 41 of the information processing apparatus 4 to the information processing terminal 3 as a search result of the charging station.

The charging record registration unit 48 generates the charging record information when it is determined that the electric vehicle 2 is charged based on, for example, a charge amount of the battery or a cruisable distance, in the vehicle information uploaded from the electric vehicle 2. The charging record registration unit 48 has a function of registering the generated charging record information in the charging record DB 45. The charging record information is the charging record information shown in FIG. 2B.

Here, examples of the case where the charging record registration unit 48 determines that the electric vehicle 2 has been charged include, for example, a case where the charge amount of the battery in the electric vehicle 2 has increased by beyond a predetermined threshold value. In other words, the charging record registration unit 48 may estimate that the electric vehicle 2 is charged when the remaining power amount of the battery increases by beyond the predetermined threshold value. In addition, another case where the charging record registration unit 48 determines that the electric vehicle 2 has been charged includes a case where the cruisable distance of the electric vehicle 2 has increased by beyond a predetermined threshold value. The reason for providing the predetermined threshold value is, for example, to exclude a case where a headlight is turned off or a case where an air conditioner is turned off. Even when the headlight is turned off or the air conditioner is turned off, the charge amount and the cruisable distance of the electric vehicle 2 may slightly increase. Therefore, the charging record registration unit 48 can exclude a case where the charge amount or the cruisable distance increases without charging the battery.

The information processing apparatus 4 may be a physically single apparatus or may be composed of a system in which a plurality of apparatuses are network-connected to each other. The information processing apparatus 4 may include, for example, respective apparatuses in which the information processing apparatus 4 is distributed to three functions. The information processing apparatus 4 may include, for example, a first server, a second server, and a third server as the respective apparatuses distributed to three functions. For example, the first server is configured to be able to exchange vehicle information with the electric vehicle 2. The second server includes, for example, the map DB 44. The second server has, for example, a function of searching the map DB 44 based on a search request. The third server includes, for example, the charging record DB

45. The third server has a function of registering the charging record information and calculating the evaluation value of the charging station.

<Operation of Information Processing System 1>

Next, the operation of the information processing system 1 will be described. First, the operation of the information processing system 1 when the driver of the electric vehicle 2 searches for a charging station using the information processing terminal 3 will be described with reference to FIG. 3. FIG. 3 is a flowchart showing a flow of processing between the electric vehicle 2, the information processing terminal 3, and the information processing apparatus 4 when a charging station is searched for using the information processing terminal 3. Hereinafter, a step of the flowchart is indicated by S. It should be noted that the information processing terminal 3 is premised to be in a state where the program 35 is activated.

Search for Charging Station

The information processing terminal 3 accepts a search instruction for a charging station based on the input of the search condition by the driver of the electric vehicle 2 (S1). When accepting the search instruction for a charging station, the information processing terminal 3 transmits a search request including a search condition to the information processing apparatus 4 (S2). The search condition is, for example, a condition regarding a region. Examples of the condition regarding a region include a region in which the driver desires to charge the battery of the electric vehicle 2. Specifically, the condition regarding a region includes a predetermined range from the location designated by the driver through the terminal input unit 32 of the information processing terminal 3. The condition regarding a region may be a predetermined range from the current location of the electric vehicle 2 or the information processing terminal 3.

When receiving the search request from the information processing terminal 3, the information processing apparatus 4 executes charging station search processing based on the search condition (S3).

Figure 4:
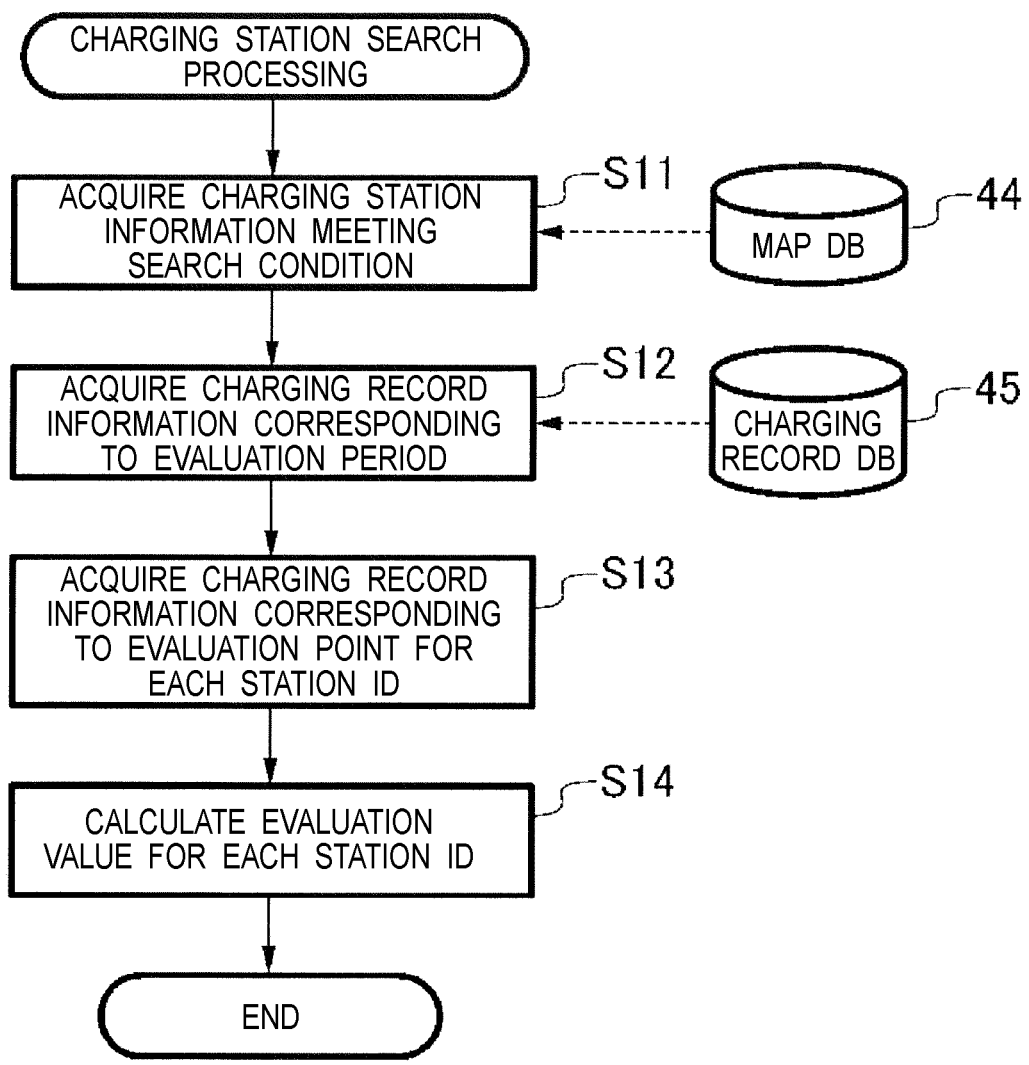
FIG. 4 is a flowchart showing a flow of charging station search processing in FIG. 3 in detail.

Here, the charging station search processing will be described with reference to FIG. 4. FIG. 4 is a flowchart showing in more detail a flow of the charging station search processing in S3 in FIG. 3.

First, the information processing apparatus 4 acquires charging station information meeting the search condition from the map DB 44 based on the search condition (S11). For example, when the search condition is a region A, the charging station information on the charging station existing in the region A is acquired from the map DB 44. It should be noted that the charging station information includes information on the longitude and latitude of the charging station.

In addition, the charging station information may include, for example, operation information, full/vacancy information, connector information, and business information, as additional information to be added to the longitude and the latitude. The operation information indicates, for example, whether the charging station is idle or the charging station is out of order. The full/vacancy information indicates, for example, whether the charging station is in a full state or a vacant state. The connector information indicates, for example, a connector type adopted by the charging station for electrically and mechanically connecting the electric vehicle to the charging station. The business information indicates, for example, the business hours of the charging station or the business date and time of the charging station.

Here, when the additional information is included, the charging station is associated with the additional information, and the charging station information is stored in the map DB 44 in advance.

Next, the information processing apparatus 4 acquires the charging record information corresponding to the evaluation period from the charging record DB 45 (S12). The evaluation period is a period for calculating an evaluation value. For example, when the evaluation period is a period of the past three months from the present, the information processing apparatus 4 acquires only the charging record information whose registration date and time is included in the period of the past three months from the present as the charging record information on the charging station to be evaluated. The information processing apparatus 4 can handle the charging record information as information with higher reliability as the registration date and time is closer to the current date and time. The information processing apparatus 4 can consider that the closer the registration date and time is to the current date and time, the higher the reliability of the information, and can cope with the establishment of a new charging station and the elimination of a charging station.

Figure 5:
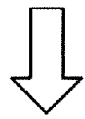
FIG. 5 is a diagram for illustrating narrowing down an evaluation period of charging record information in the charging station search processing of the information processing system according to the first embodiment.

Next, an outline of processing of acquiring the charging record information corresponding to the evaluation period in S12 will be described with reference to FIG. 5. For example, when the current date and time is Jul. 10, 2020 at 22:00, the information processing apparatus 4 does not acquire the charging record information in which the registration date and time is March 2020, which is not included in the period of the past 3 months. FIG. 5 illustrates when the registration date and time is Mar. 7, 2020 at 11:11 as 2020030711. As shown in FIG. 5, when the information processing apparatus 4 does not acquire the charging record information on March 2020, the registration date and time 202003071111 is excluded as narrowing down the evaluation period.

Next, the information processing apparatus 4 further acquires charging record information corresponding to the evaluation point for each station ID from the charging record information acquired in S12 (S13). The evaluation point means, for example, within a predetermined range from the location of the charging station stored in the map DB 44. The "within a predetermined range" can be, for example, a rectangular region separated by a predetermined distance in each of the north, south, east, and west directions centered on the location of the charging station stored in the map DB 44. Examples of the predetermined distance include, for example, 50 m×50 m. The predetermined distance may be, for example, 5 m×5 m. That is, the information processing apparatus 4 acquires, as the charging station to be evaluated, only the charging record information in which the location of the charging record information is within a predetermined range from the location of the charging station to be evaluated. It is also conceivable that the location information included in the charging record information is not accurate. By acquiring the charging record information corresponding to the evaluation point, the information processing apparatus 4 can exclude the location information estimated to be inaccurate.

Figure 6:
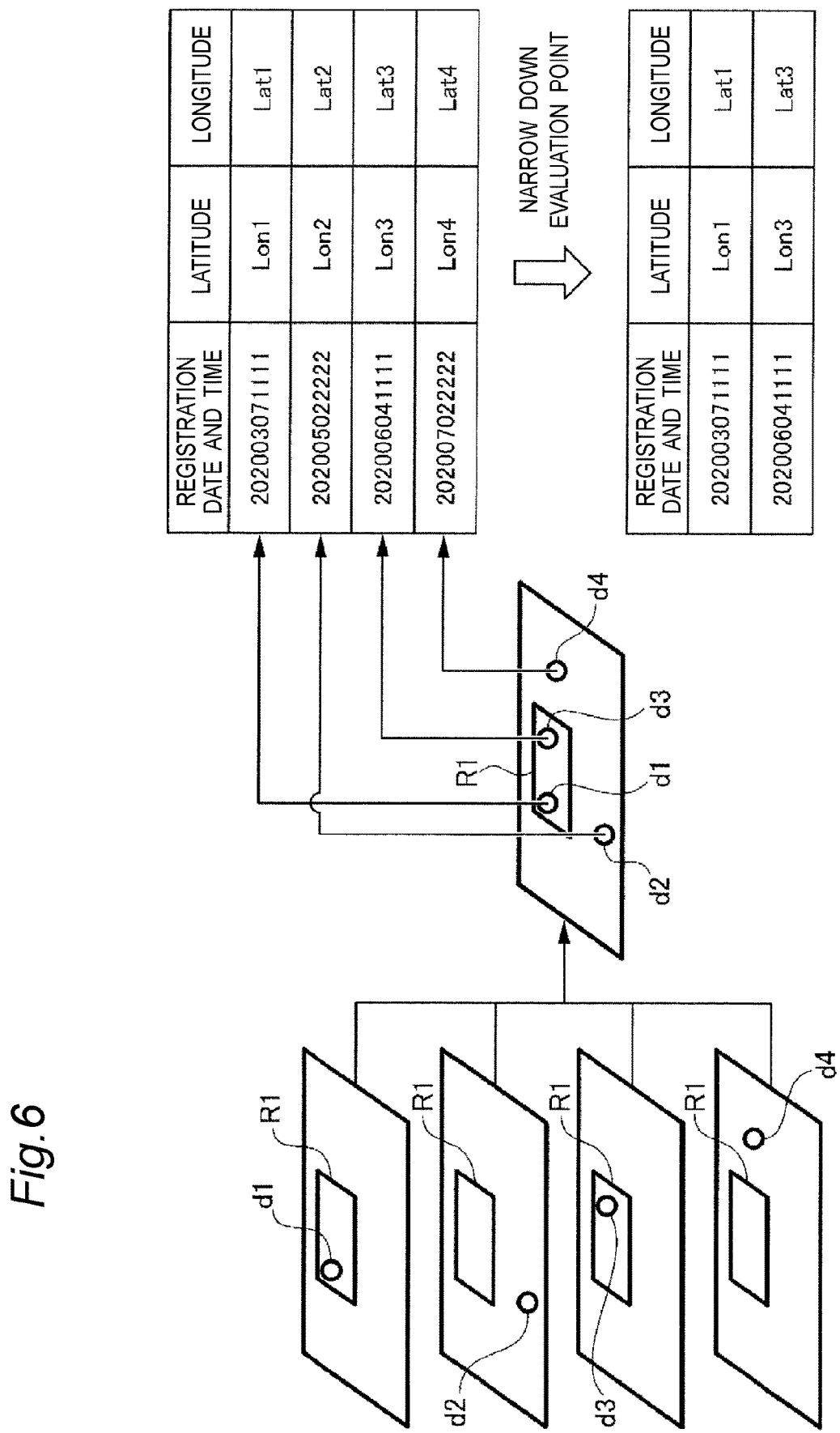
FIG. 6 is a diagram for illustrating narrowing down an evaluation point of charging record information in the charging station search processing of the information processing system according to the first embodiment.

FIG. 6 is a diagram illustrating an outline of processing of acquiring the charging record information corresponding to the evaluation point in S13. For example, as shown in FIG. 6, when charging record information d1 to d4 exists near the charging station to be evaluated, the information processing apparatus 4 acquires, among the charging record information d1 to d4, only the charging record information d1 and the charging record information d3 within a region R1 within a predetermined range from the charging station to be evaluated, and does not acquire the charging record information d2 and the charging record information d4 outside the region R1. Here, as illustrated in FIG. 6, the region R1 may have a rectangular shape, but is not limited to a rectangular shape. The region R1 may have, for example, a polygonal shape, an elliptical shape, or a circular shape. When the region R1 has a circular shape, for example, the region R1 may be set to a circular shape having a predetermined radius around the location of the electric vehicle 2 in which the battery is charged. The information processing apparatus 4 can set the predetermined radius to, for example, 11 m.

Incidentally, there is also a case where the GNSS module cannot accurately detect the location of the electric vehicle 2, for example. Therefore, in the information processing apparatus 4, there is a possibility that the location information calculated as the charging record information from the latitude and longitude included in the vehicle information becomes unstable. In addition, the information processing apparatus 4 needs to match the location information from the unstable vehicle information with the uniquely determined charging station.

Thus, in creating the charging record information, the information processing apparatus 4 aggregates the position included in the vehicle information in which the electric vehicle 2 is charged at the charging station into the information of the nearby charging spot point. The information processing apparatus 4 can normalize the location of the charging station by aggregating in advance the locations included in the vehicle information into the information on the recent charging spot point. For example, in addition to the location included in the vehicle information, the information processing apparatus 4 can aggregate information by adding the location included in the vehicle information and the location of the charging station included in the map DB within a predetermined range to the charging record DB. By normalizing the location of the charging station in advance, the information processing apparatus 4 can improve the processing speed by presorting the data before searching for the charging station. The information processing apparatus 4 contributes to improvement in processing speed when returning the charging station and the charging record information corresponding to the charging station in response to a request from the information processing terminal. In addition, the information processing apparatus 4 does not have to register in the charging record DB the vehicle information in which the location of the charging station included in the map DB is not in the vicinity when normalizing the location of the charging station in advance. Thus, the information processing apparatus 4 may also be excluded from being registered in the charging record DB with the home charging facility as a charging station.

Next, the information processing apparatus 4 calculates an evaluation value for each station ID based on the charging record information acquired in S13 (S14). The evaluation value may be, for example, the number of pieces of charging record information corresponding to the evaluation period and the evaluation point. Regarding the evaluation value, the evaluation value may be calculated by, for example, performing predetermined calculation on the number of pieces of charging record information corresponding to the evaluation period and the evaluation point. For example, the evaluation value may be calculated by weighting the recency of the registration date and time of the charging record information or the distance between the location of the charging record information and the location of the charging station.

Returning to FIG. 3, the information processing apparatus 4 transmits the search result of the charging station search processing to the information processing terminal 3 (S4). The search result of the charging station search processing is the charging station information shown in FIG. 2C.

When receiving the search result from the information processing apparatus 4, the information processing terminal 3 displays the search result on the terminal output unit 33 (S5). For example, the charging station information on the charging station meeting the search condition may be displayed in a list format, or the icon and the evaluation value of the charging station meeting the search condition may be displayed on a map. The icon may be an icon indicating the type of charging standard.

Figure 15:
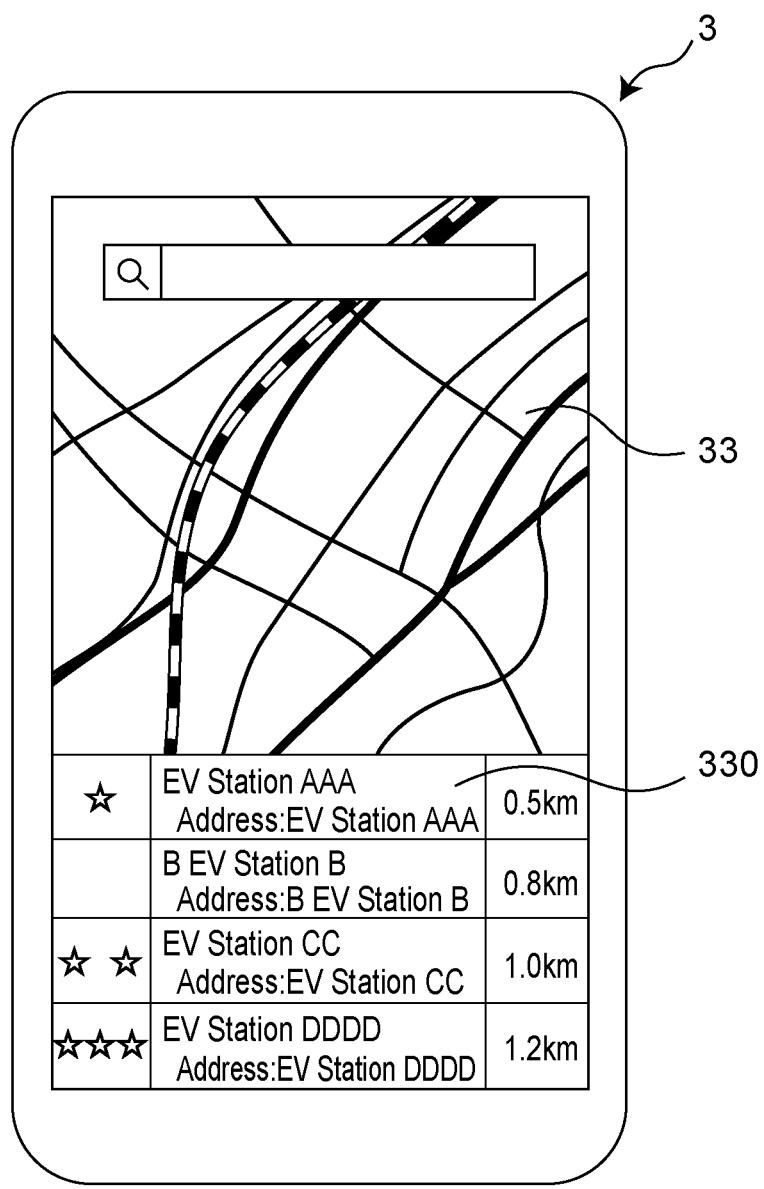
FIG. 15 is a schematic diagram showing an example in which search results of charging stations are displayed in a list format.

For example, as shown in FIG. 15, the information processing terminal 3 displays the terminal output unit 33 with the search results 330 in a list format. The list illustrated in FIG. 15 includes information on the charging stations as the search results. It should be noted that in the example in FIG. 15, the evaluation value is represented by the number of star marks. Examples of the information regarding the charging station include name information on the charging station and location information on the charging station in addition to the evaluation value information of the charging station. Examples of the location information of the charging station include, for example, an address or latitude and longitude.

As a way of representing the evaluation value by the number of star marks, for example, there is a method of determining the evaluation value in consideration of the number of times of use in the past.

For example, as shown in FIG. 15, when the top charging station has one star mark, the display method of the evaluation value indicates that the top charging station has one-time charging record within the past three months. For example, when the second charging station from the top has no star mark, the display method of the evaluation value indicates that the second charging station from the top has no charging record within the past three months. For example, when the third charging station from the top has two star marks, the display method of the evaluation value indicates that the third charging station from the top has a charging record of two to five times within the past three months. For example, when the fourth charging station from the top has three star marks, the display method of the evaluation value indicates that the fourth charging station from the top has a charging record of six times or more within the past three months. In other words, the information processing terminal 3 is configured such that the evaluation value can be displayed on the terminal output unit 33 by being categorized for each number of times of charging record in a predetermined period.

In addition, the way of representing other evaluation values by the number of star marks is not limited to the case of considering only the past number of uses. For example, when the time point of charging in the past is older than a predetermined time point, the information processing terminal 3 may add negative evaluation to the evaluation value. For example, the information processing terminal 3 may obtain the number of star marks based on the number of times of use in the past, and then reduce the number of star marks by one and cause the terminal output unit 33 to display the number of star marks if the time point of the last charging is a half month or more and less than one month ago. For example, the information processing terminal 3 may obtain the number of star marks based on the number of times of use in the past, and then reduce the number of star marks by two and cause the terminal output unit 33 to display the number of star marks if the time point of the last charging is one month or more and less than three months ago.

Next, when setting a charging station selected from among the search results as a navigation destination based on an input by the driver of the electric vehicle 2 (S6), the information processing terminal 3 transmits charging station information regarding the set destination to the electric vehicle 2 (S7).

If the electric vehicle 2 receives the charging station information as the destination, the navigation unit 23 provides route guidance to the charging station based on the location of the charging station (S8).

Registration of Charging Record Information

Figure 7:
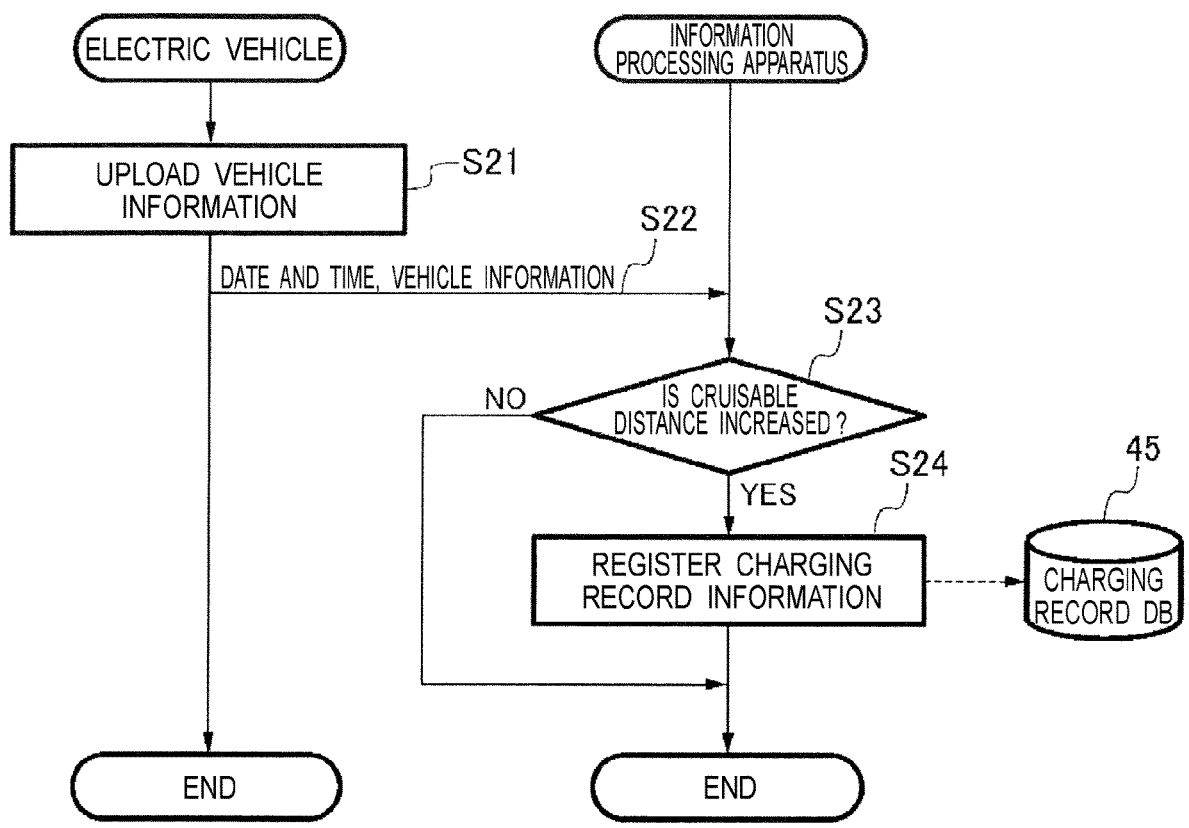
FIG. 7 is a flowchart showing a flow of processing between the electric vehicle and the information processing apparatus when charging record information is registered in the information processing system according to the first embodiment.

Next, an operation of the information processing system 1 when the information processing apparatus 4 registers the charging record information will be described with reference to FIG. 7. FIG. 7 is a flowchart showing a flow of processing between the electric vehicle 2 and the information processing apparatus 4 when the information processing apparatus 4 registers the charging record information. It should be noted that FIG. 7 shows the operation of the information processing system 1 at the timing when the electric vehicle 2 uploads the vehicle information. Although FIG. 7 illustrates the upload of the vehicle information from the electric vehicle 2 to the information processing apparatus 4, the vehicle information may be uploaded from the electric vehicle 2 to the information processing apparatus 4 via the information processing terminal 3.

When the electric vehicle 2 uploads the vehicle information (S21), the vehicle information including the uploaded date and time is transmitted to the information processing apparatus 4 (S22). The flow of steps S21 and S22 in FIG. 7 may be as follows, for example, when the first server, the second server, and the third server are distributed. That is, for example, the electric vehicle 2 periodically uploads the vehicle information to the first server (S21). Then, the second server requests the first server to acquire the vehicle information. When the vehicle information having date and time, latitude, longitude, and the like is stored in a CVS file format in the first server, the second server requests the first server to acquire the CVS file. The first server transmits the uploaded vehicle information to the second server in response to the request (S22).

The information processing apparatus 4 determines whether or not the cruisable distance of the electric vehicle 2 has increased based on the received vehicle information (S23). The information processing apparatus 4 may determine, for example, a case where the cruising distance increases to a value larger than the cruising distance of the vehicle information transmitted last time by a predetermined threshold value or more to be a case where the cruisable distance of the electric vehicle 2 increases.

If the information processing apparatus 4 determines that the cruisable distance of the electric vehicle 2 has increased (YES in S23), the information processing apparatus 4 generates charging record information based on the received information, and registers the generated charging record information in the charging record DB 45 (S24). More specifically, the information processing apparatus 4 sets the location of the electric vehicle 2 included in the uploaded vehicle information as the location of the charging record information, sets the uploaded date and time as the registration date and time, and generates the charging record information. If the information processing apparatus 4 determines that the cruisable distance of the electric vehicle 2 has not increased (NO in S23), the information processing apparatus 4 ends the processing without generating the charging record information.

It should be noted that in the processing shown in FIG. 7, the information processing apparatus 4 determines whether or not the cruisable distance of the electric vehicle 2 has increased in S23, but aside from this, the information processing apparatus 4 may determine whether or not the charge amount of the battery of the electric vehicle 2 has increased in S23. When the information processing apparatus 4 determines that the charge amount of the battery of the electric vehicle 2 has increased, the information processing apparatus 4 may generate charging record information and register the generated charging record information in the charging record DB 45.

As described above, in the information processing system 1, based on the vehicle information uploaded from the electric vehicle 2, the information processing apparatus 4 regards a case where the cruisable distance of the electric vehicle 2 increases beyond a predetermined threshold value as a case where the electric vehicle 2 is charged, and registers and accumulates the charging record information. When receiving a search request for a charging station from the information processing terminal 3, the information processing apparatus 4 calculates an evaluation value using the charging record information, and displays the calculated evaluation value on the information processing terminal 3 as a search result. Therefore, according to the information processing system 1, it is possible to notify the charging station capable of charging the electric vehicle by a relatively simple method.

In the information processing system 1, the information processing apparatus 4 extracts only the charging record information corresponding to the evaluation point and the evaluation period from the charging station to be evaluated. Therefore, according to the information processing system 1, it is possible to provide an evaluation value with higher reliability.

MODIFIED EXAMPLE

Manual Evaluation

In the information processing system 1, the information processing apparatus 4 determines whether the cruisable distance has increased based on the vehicle information uploaded from the electric vehicle 2, that is, whether charging has been performed, but instead of or in addition to this, the information processing apparatus 4 may determine whether charging has been performed based on manual evaluation of the driver of the electric vehicle 2.

Figure 8:
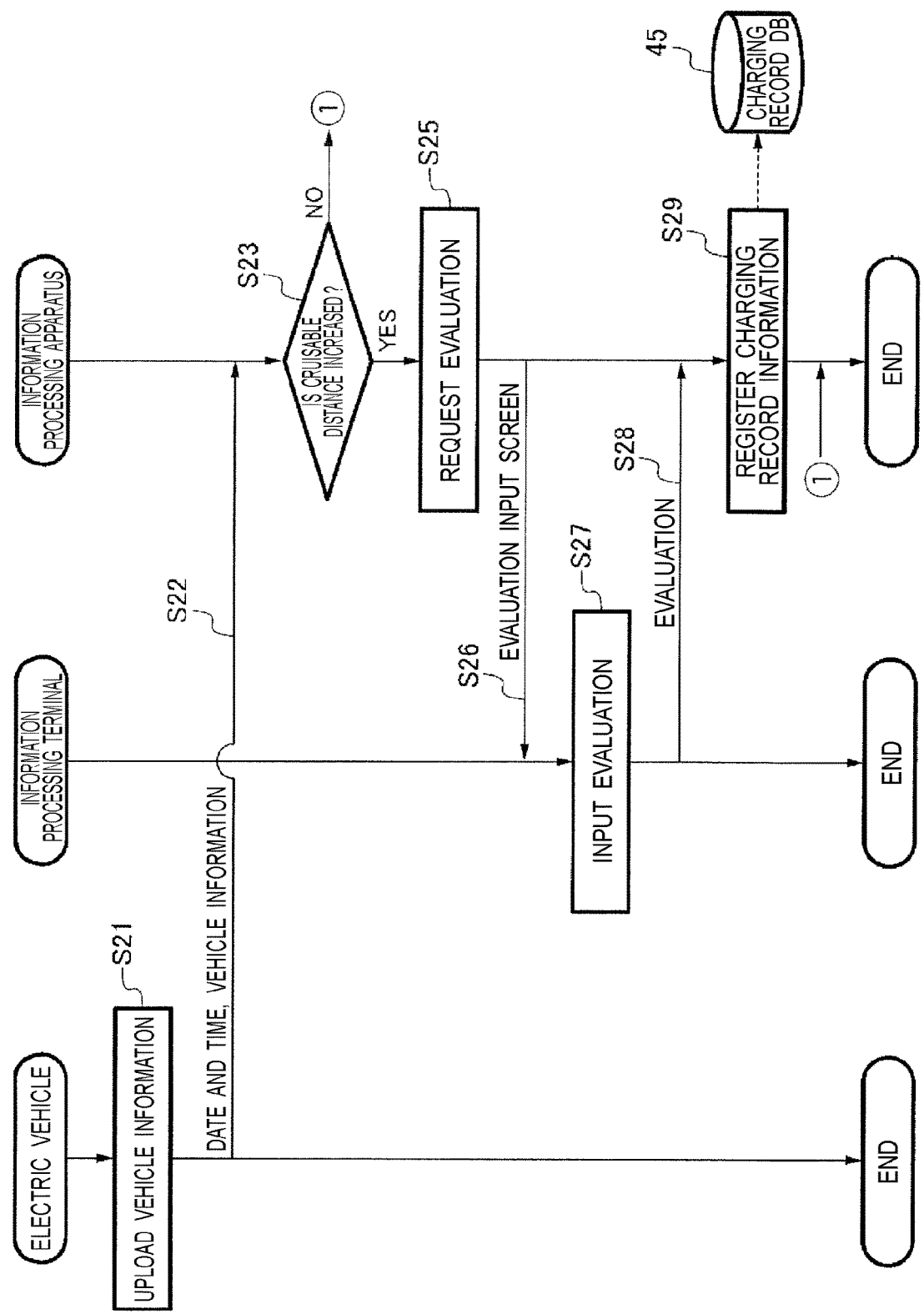
FIG. 8 is a flowchart showing a modified example of a flow of processing between the electric vehicle and the information processing apparatus when charging record information is registered in the information processing system according to the first embodiment.

FIG. 8 is a flowchart showing a flow of processing between the electric vehicle 2, the information processing terminal 3, and the information processing apparatus 4 when the information processing apparatus 4 registers the charging record information by taking into account the manual evaluation. Since the steps from S21 to S23 are the same as those in FIG. 7, the description thereof is omitted.

If the information processing apparatus 4 determines that the cruisable distance of the electric vehicle 2 has increased (YES in S23), the information processing apparatus 4 executes evaluation request processing (S25). The evaluation request processing is processing for asking the driver of the electric vehicle 2 to answer whether charging has been possible. In the evaluation request processing, the information processing apparatus 4 transmits an evaluation input screen to the information processing terminal 3 (S26).

When accepting the evaluation based on the input of the driver of the electric vehicle 2 (S27), the information processing terminal 3 displaying the evaluation input screen transmits the accepted evaluation to the information processing apparatus 4 (S28). Here, the evaluation may be, for example, any one of two options of "charging was successful" and" charging was not successful".

The information processing apparatus 4 generates charging record information based on the received evaluation, and registers the generated charging record information in the charging record DB 45 (S29). For example, in the case of a positive evaluation of "charging was successful", the charging record information shown in FIG. 2B may be generated.

According to this modified example, it is possible to further improve the reliability of the evaluation value of the charging station by taking into account the manual evaluation by the driver.

Electric Vehicle

The information processing system 1 according to the first embodiment uses the information processing terminal 3 as a component, but does not have to use the information processing terminal 3 as a component. That is, the electric vehicle 2 may have the above-described functions of the information processing terminal 3. In this case, the electric vehicle 2 has a function of requesting the information processing apparatus 4 to search for a charging station and displaying the search result of the charging station from the information processing apparatus 4. In addition, when the information processing system 1 further includes the configuration of the above manual evaluation, the electric vehicle 2 has a function of evaluation input.

Second Embodiment

Figure 9:
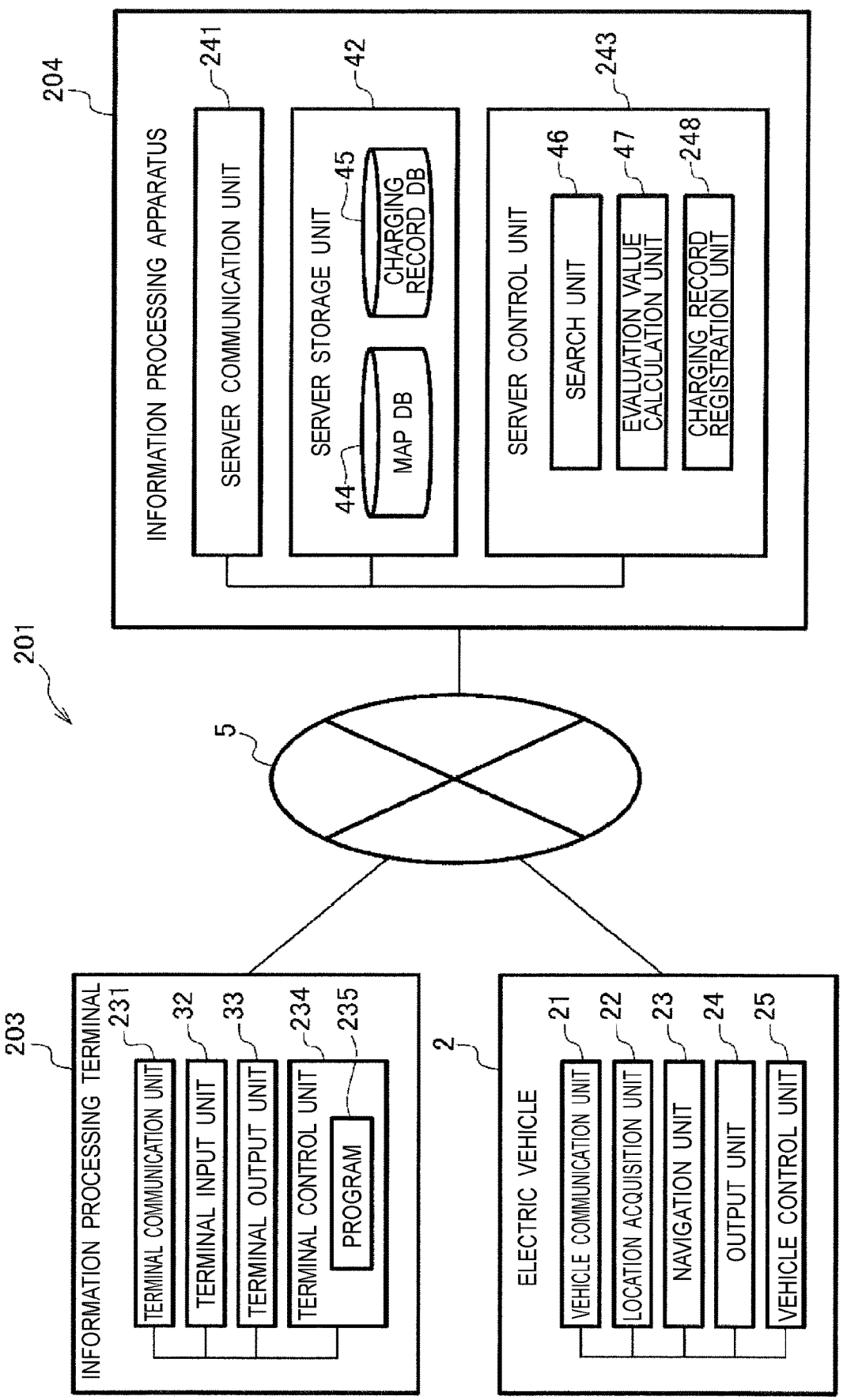
FIG. 9 is a schematic configuration diagram of an information processing system according to a second embodiment.

<Configuration of Information Processing System 201>
FIG. 9 is a schematic configuration diagram of an information processing system 201 according to a second embodiment. The information processing system 201 is configured such that an information processing apparatus 204 provides information regarding a charging station capable of performing charging to an information processing terminal 203 carried by a driver of an electric vehicle 2. As shown in FIG. 9, the information processing system 201 includes the electric vehicle 2, the information processing terminal 203, and the information processing apparatus 204. The information processing system 201 is different from the information processing system 1 in a method of detecting charging of the electric vehicle 2 by the information processing apparatus 204. In the second embodiment, the parts having the same functions and the same processing as described in the first embodiment are denoted by the same reference numerals, and the description thereof will be omitted.

Information Processing Terminal 203

The information processing terminal 203 includes a terminal communication unit 231, a terminal input unit 32, a terminal output unit 33, and a terminal control unit 234. It should be noted that although not shown, the information processing terminal 203 is configured to be able to acquire location information indicating the current location of the information processing terminal 203. The information processing terminal 203 is provided with, for example, a GNSS module. The location of the information processing terminal 203 includes, for example, latitude and longitude.

The terminal communication unit 231 is configured to be able to mutually communicate with the information processing apparatus 204 and the electric vehicle 2. The terminal communication unit 231 is configured to transmit a search request for a charging station to the information processing apparatus 204. The terminal communication unit 231 is configured to receive the search result of the charging station from the information processing apparatus 204. The terminal communication unit 231 is configured to transmit information regarding the charging station set as the navigation destination in the information processing terminal 203 to the electric vehicle 2 and the information processing apparatus 204. The terminal communication unit 231 is configured to transmit the location of the information processing terminal 203 to the information processing apparatus 204.

The terminal control unit 234 includes, for example, a read only memory (ROM), a read access memory (RAM), and a central processing unit (CPU). The terminal control unit 234 stores a program 235 for using the information processing system 201.

By executing the program 235, the terminal control unit 234 executes processing on the information processing terminal 203 side of the search processing regarding the charging station. Specifically, the terminal control unit 234 can perform control regarding the input of a search condition for a charging station over the information processing apparatus 204 and control regarding the display of a search result received from the information processing apparatus 204.

By executing the program 235, the terminal control unit 234 can perform control of transmitting information regarding the charging station set as the navigation destination to the electric vehicle 2 and the information processing apparatus 204. In addition, the terminal control unit 234 can perform control of transmitting information including the location of the information processing terminal 203 to the information processing apparatus 204 at predetermined time intervals.

Information Processing Apparatus 204

The information processing apparatus 204 includes a server communication unit 241, a server storage unit 42, and a server control unit 243.

The server communication unit 241 is configured to be able to mutually communicate with the electric vehicle 2 and the information processing terminal 203. The server communication unit 241 is configured to appropriately receive vehicle information from the electric vehicle 2. The server communication unit 241 is configured to receive a search request for a charging station from the information processing terminal 203. The server communication unit 241 is configured to transmit the search result of the charging station to the information processing terminal 203. The server communication unit 241 is configured to receive information regarding a charging station set as a destination from the information processing terminal 203. The server communication unit 241 is configured to receive the location of the information processing terminal 203 as appropriate.

The server control unit 243 functionally includes a search unit 46, an evaluation value calculation unit 47, and a charging record registration unit 248.

The charging record registration unit 248 has a function of generating charging record information when it is determined that the electric vehicle 2 is charged based on the location and the date and time of the information processing terminal 203 to be uploaded from the information processing terminal 203, and registering the generated charging record information in a charging record DB 45. The charging record information is the charging record information shown in FIG. 2B.

More specifically, the charging record registration unit 248 sets a geofence around the location of the charging station set as the destination. For example, a bounding circle having a radius of several tens of meters from the location of the charging station may be set as the geofence. When determining that the information processing terminal 203 has continuously existed in the geofence for a predetermined time based on the location and the date and time of the information processing terminal 203 uploaded from the information processing terminal 203, the charging record registration unit 248 determines that the electric vehicle 2 is charged. The predetermined time is, for example, a time required for the electric vehicle 2 to be charged. For example, the predetermined time may be several tens of minutes.

It should be noted that the information processing apparatus 204 may be a physically single apparatus or may be composed of a system in which a plurality of apparatuses are network-connected to each other.

<Operation of Information Processing System 201>

Figure 10:
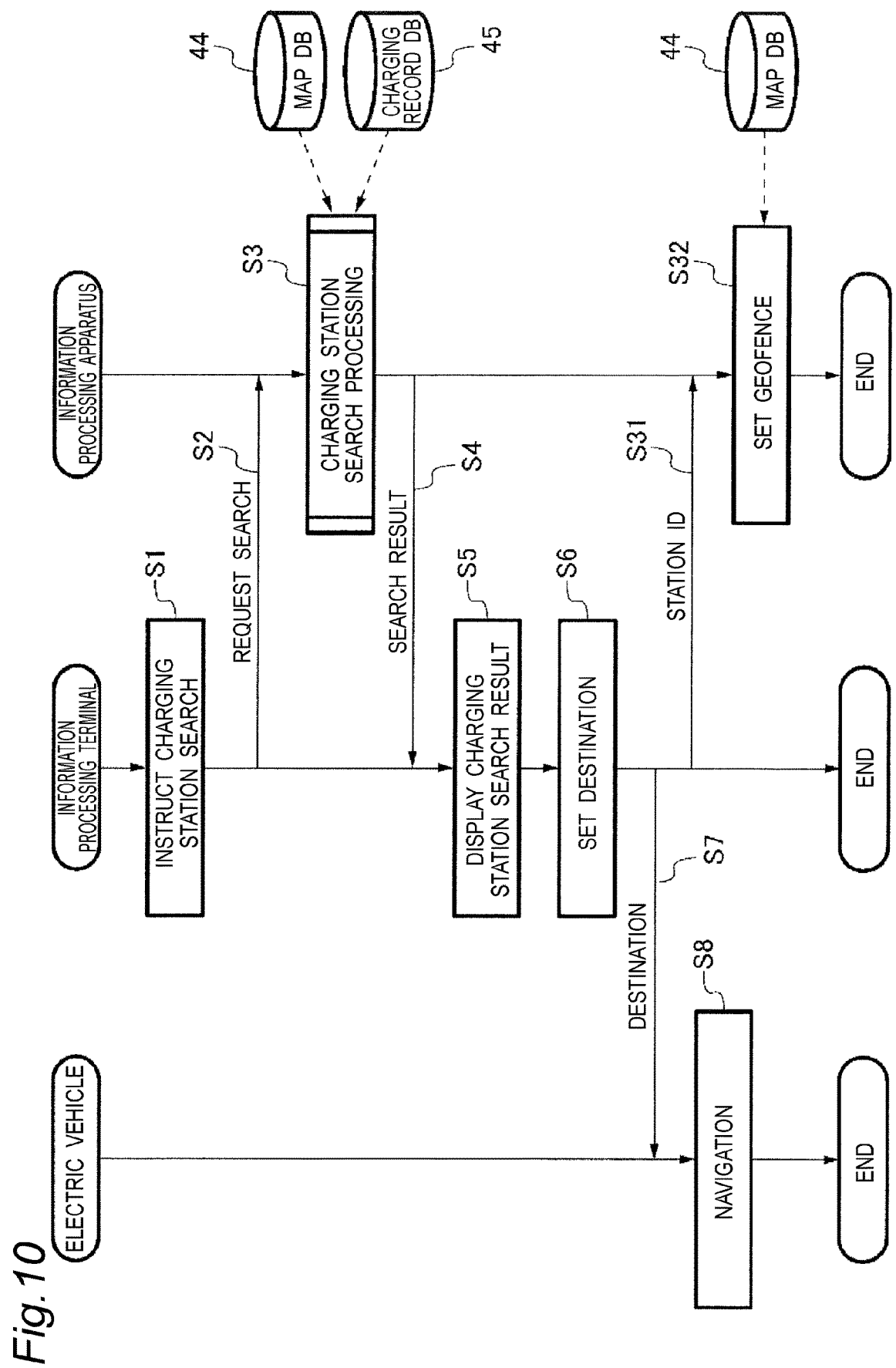
FIG. 10 is a flowchart showing a flow of processing between an electric vehicle, an information processing terminal, and an information processing apparatus when a search for a charging station is performed in the information processing system according to the second embodiment.

Next, the operation of the information processing system 201 will be described. First, the operation of the information processing system 201 when the driver of the electric vehicle 2 searches for a charging station using the information processing terminal 203 will be described with reference to FIG. 10. FIG. 10 is a flowchart showing a flow of processing between the electric vehicle 2, the information processing terminal 203, and the information processing apparatus 204 when a charging station is searched for using the information processing terminal 203. It should be noted that the information processing terminal 203 is premised to be in a state where the program 235 is activated.

Search for Charging Station

Since steps S1 to S8 are the same as the steps of the first embodiment, steps in and after S31 will be described. When setting a charging station selected from among the search results as a navigation destination based on an input by the driver of the electric vehicle 2 (S6), the information processing terminal 203 transmits a station ID of the set charging station to the information processing apparatus 204 (S31).

When receiving the station ID, the information processing apparatus 204 refers to the charging station information in a map DB 44 based on the station ID, and sets a geofence around the location of the corresponding charging station (S32). For example, a bounding circle having a radius of several tens of meters from the location of the charging station stored in the map DB 44 may be set as the geofence.

Registration of Charging Record Information

Figure 11:
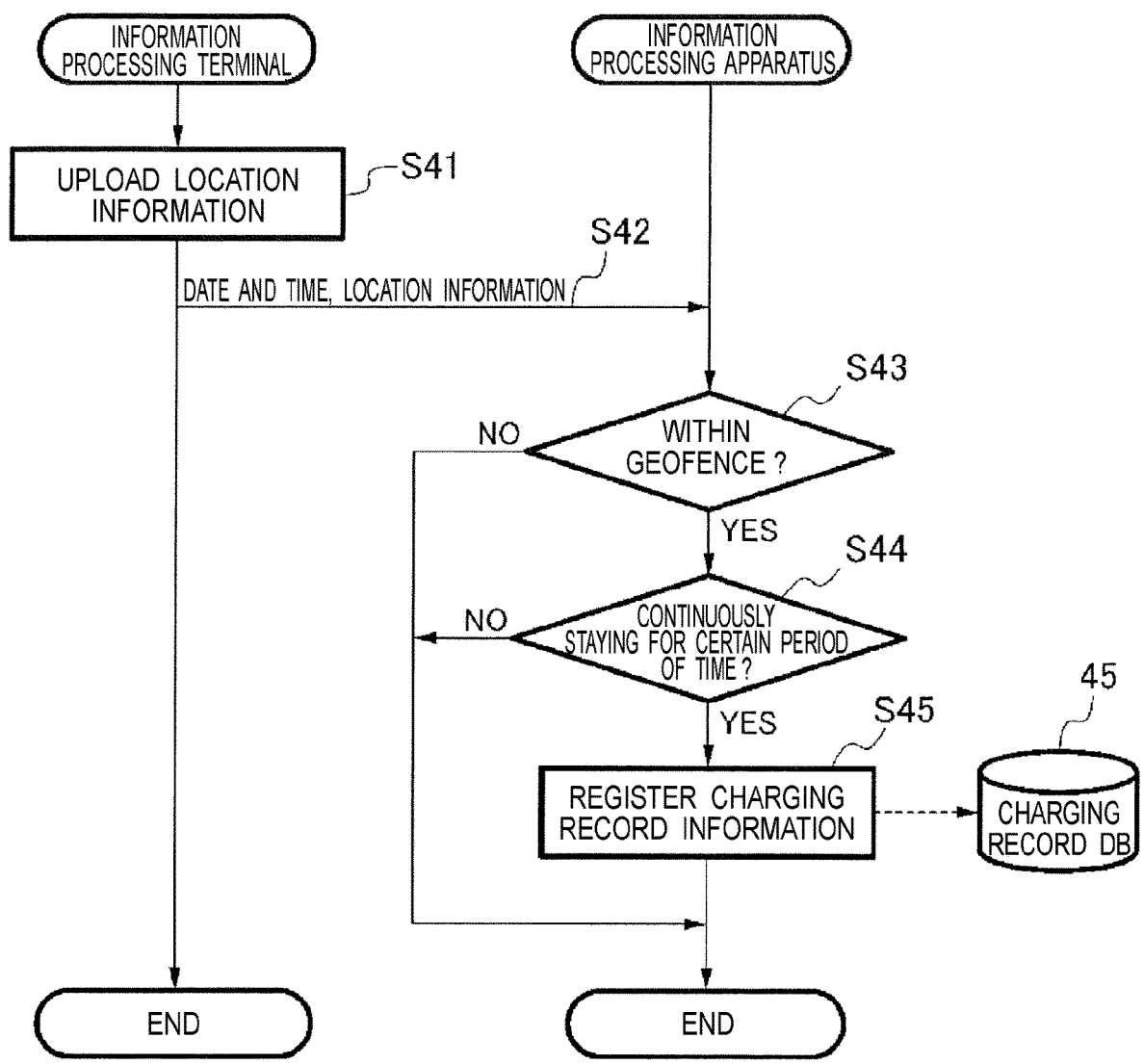
FIG. 11 is a flowchart showing a flow of processing between the information processing terminal and the information processing apparatus when charging record information is registered in the information processing system according to the second embodiment.

Next, an operation of the information processing system 201 when the information processing apparatus 204 registers the charging record information will be described with reference to FIG. 11. FIG. 11 is a flowchart showing a flow of processing between the information processing terminal 203 and the information processing apparatus 204 when the information processing apparatus 204 registers the charging record information. It should be noted that FIG. 11 shows the operation of the information processing system 201 at the timing when the information processing terminal 203 uploads the location information.

When the information processing terminal 203 uploads the location information (S41), the location information including the uploaded date and time is transmitted to the information processing apparatus 204 (S42). Hereinafter, information regarding the location and the date and time of the information processing terminal 203 uploaded from the information processing terminal 203 is referred to as upload information.

The information processing apparatus 204 determines whether or not the information processing terminal 203 exists in the set geofence based on the location of the information processing terminal 203 of the upload information (S43). If determining that the information processing terminal 203 exists in the set geofence (YES in S43), the information processing apparatus 204 determines whether or not the information processing terminal 203 exists continuously in the geofence for a certain period of time (S44). The certain period of time is, for example, a period of time required for the electric vehicle 2 to be charged.

If determining that the information processing terminal 203 exists continuously in the geofence for a certain period of time (YES in S44), the information processing apparatus 204 generates charging record information and registers the generated charging record information in the charging record DB 45 (S45). More specifically, the information processing apparatus 204 sets the location of the information processing terminal 203 in the upload information when the condition of S44 is satisfied as the location of the charging record information, sets the date and time of the upload information when the condition of S44 is satisfied as the registration date and time, and generates the charging record information.

If determining that the information processing terminal 203 does not exist in the geofence (NO in S43) or the information processing terminal 203 does not continuously exist in the geofence (NO in S44), the information processing apparatus 204 does not generate the charging record information, and ends the processing.

As described above, in the information processing system 201, the information processing apparatus 204 sets the geofence to the charging station to be the destination. Based on the information to be uploaded from the information processing terminal 203, the information processing apparatus 204 regards a case where the information processing terminal 203 continuously exists in the geofence for a certain period of time as a case where the electric vehicle 2 is charged, and registers and accumulates the charging record information. When receiving a search request for a charging station from the information processing terminal 203, the information processing apparatus 204 calculates an evaluation value using the charging record information, and displays the calculated evaluation value on the information processing terminal 203 as a search result. Therefore, according to the information processing system 201, it is possible to notify the charging station capable of charging the electric vehicle by a relatively simple method.

In the information processing system 201, the information processing apparatus 204 extracts only the charging record information corresponding to the evaluation point and the evaluation period from the charging station to be evaluated.

Therefore, according to the information processing system 201, it is possible to provide an evaluation value with higher reliability.

MODIFIED EXAMPLE

Vehicle Information

The information processing apparatus 204 determines whether or not the information processing terminal 203 continuously stays in the geofence for a certain period of time based on the location of the information processing terminal 203, but the determination method is not limited thereto. For example, the information processing apparatus 204 may determine whether or not the electric vehicle 2 continuously stays in the geofence for a certain period of time based on the location of the electric vehicle 2 included in the vehicle information to be uploaded from the electric vehicle 2.

Manual Evaluation

Similarly to the information processing system 1, the information processing system 201 may also determine whether or not charging has been performed based on manual evaluation of the driver of the electric vehicle 2 instead of or in addition to the determination shown in FIG. 11. For example, when determining that the electric vehicle 2 continuously stays in the geofence for a certain period of time, the information processing apparatus 204 may execute the evaluation request processing. The reliability of the evaluation value of the charging station can be further improved.

Third Embodiment

<Configuration of Information Processing System 301>

Figure 12:
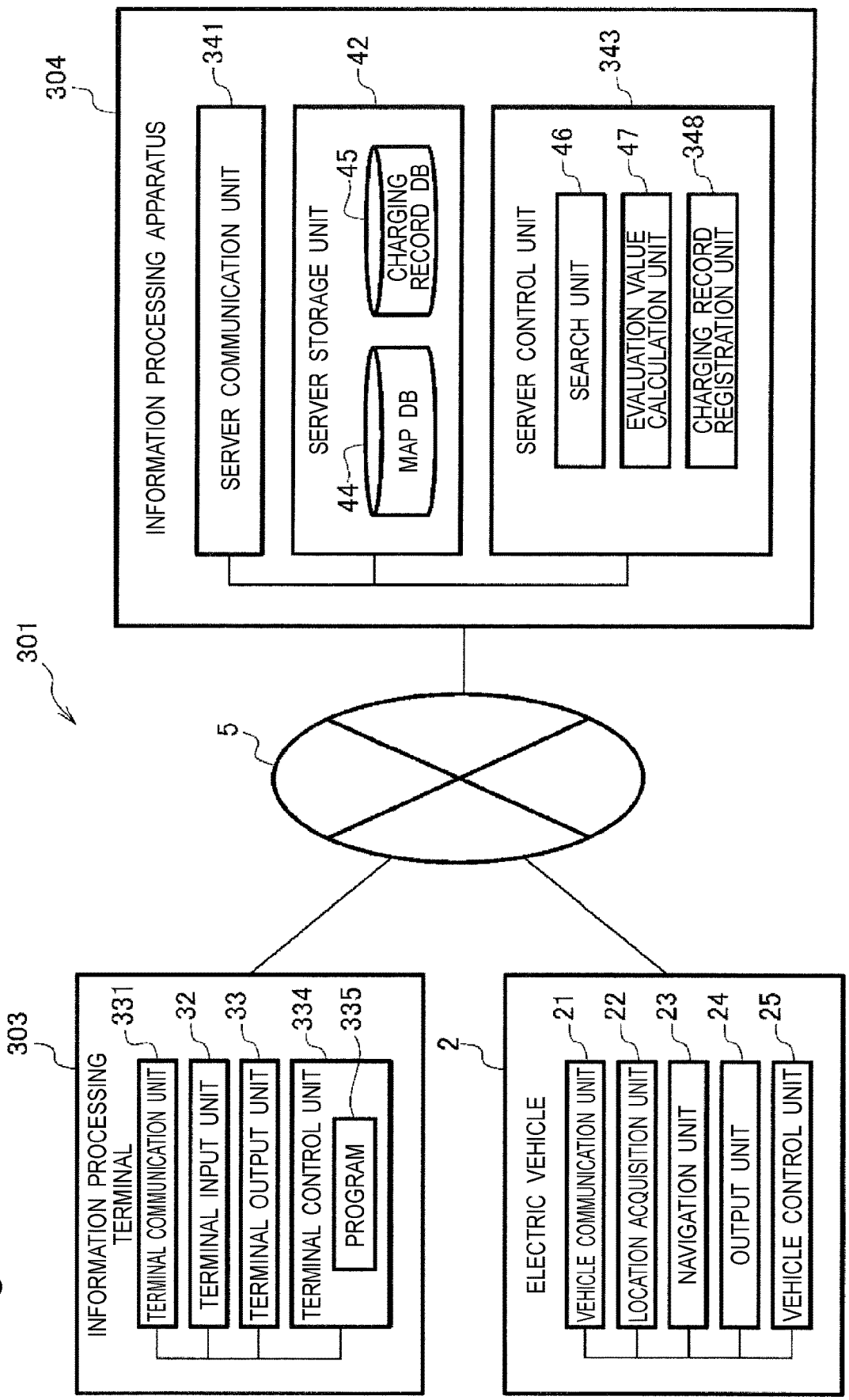
FIG. 12 is a schematic configuration diagram of an information processing system according to a third embodiment.

FIG. 12 is a schematic configuration diagram of an information processing system 301 according to a third embodiment. The information processing system 301 is configured such that an information processing apparatus 304 provides information regarding a charging station capable of performing charging to an information processing terminal 303 carried by a driver of an electric vehicle 2. As shown in FIG. 12, the information processing system 301 includes the electric vehicle 2, the information processing terminal 303, and the information processing apparatus 304. The information processing system 301 is different from the information processing system 201 in that the setting agent of a geofence is changed from the information processing apparatus 204 to the information processing terminal 303. In the third embodiment, the parts having the same functions and the same processing as described in the first embodiment and the second embodiment are denoted by the same reference numerals, and the description thereof will be omitted.

Information Processing Terminal 303

The information processing terminal 303 includes a terminal communication unit 331, a terminal input unit 32, a terminal output unit 33, and a terminal control unit 334. It should be noted that although not shown, the information processing terminal 303 is configured to be able to acquire location information indicating the current location of the information processing terminal 303. The information processing terminal 303 is provided with, for example, a GNSS module. The location of the information processing terminal 303 includes, for example, latitude and longitude.

The terminal communication unit 331 is configured to be able to mutually communicate with the information processing apparatus 304 and the electric vehicle 2. The terminal communication unit 331 is configured to transmit a search request for a charging station to the information processing apparatus 304. The terminal communication unit 331 is configured to receive the search result of the charging station from the information processing apparatus 304. The terminal communication unit 331 is configured to transmit information regarding the charging station set as the navigation destination in the information processing terminal 303 to the electric vehicle 2. The terminal communication unit 331 is configured to transmit a request for registering charging record information to the information processing apparatus 304 when the information processing terminal 303 determines that charging has been performed on the electric vehicle 2. Hereinafter, the request for registering the charging record information is referred to as a charging record registration request.

The terminal control unit 334 includes, for example, a read only memory (ROM), a read access memory (RAM), and a central processing unit (CPU). The terminal control unit 334 stores a program 335 for using the information processing system 301.

By executing the program 335, the terminal control unit 334 executes processing on the information processing terminal 303 side of the search processing regarding the charging station. Specifically, the terminal control unit 334 can perform control regarding the input of a search condition for a charging station over the information processing apparatus 304 and control regarding the display of a search result received from the information processing apparatus 304.

By executing the program 335, the terminal control unit 334 can perform control of transmitting information regarding the charging station set as the navigation destination to the electric vehicle 2.

The terminal control unit 334 has a geofence function. Specifically, the terminal control unit 334 performs control of setting a geofence near the location of the charging station set as the destination, and performs determination control on whether or not the information processing terminal 303 stays in the geofence. For example, a bounding circle having a radius of several tens of meters from the location of the charging station may be set as the geofence. When determining that the information processing terminal 303 has continuously existed in the geofence for a certain period of time, the terminal control unit 334 determines that the electric vehicle 2 has been charged, and performs control of transmitting a charging record registration request to the information processing apparatus 304.

Information Processing Apparatus 304

The information processing apparatus 304 includes a server communication unit 41, a server storage unit 42, and a server control unit 343.

The server communication unit 341 is configured to be able to mutually communicate with the electric vehicle 2 and the information processing terminal 303. The server communication unit 341 is configured to appropriately receive vehicle information from the electric vehicle 2. The server communication unit 341 is configured to receive a search request for a charging station from the information processing terminal 303. The server communication unit 341 is configured to transmit the search result of the charging station to the information processing terminal 303. The server communication unit 341 is configured to receive a charging record registration request from the information processing terminal 303. The charging record registration request includes the uploaded date and time and the location of the information processing terminal 303.

The server control unit 343 functionally includes a search unit 46, an evaluation value calculation unit 47, and a charging record registration unit 348.

When receiving the charging record registration request from the information processing terminal 303, the charging record registration unit 348 has a function of generating charging record information based on the charging record registration request and registering the generated charging record information in a charging record DB 45. The charging record information is the charging record information shown in FIG. 2B. More specifically, the charging record registration unit 348 sets the location of the information processing terminal 303 included in the charging record registration request as the location of the charging record information, sets the upload date and time included in the charging record registration request as the registration date and time, and generates the charging record information.

It should be noted that similarly to the information processing apparatus 4, the information processing apparatus 304 may be a physically single apparatus or may be composed of a system in which a plurality of apparatuses are network-connected to each other.

<Operation of Information Processing System 301>

Figure 13:
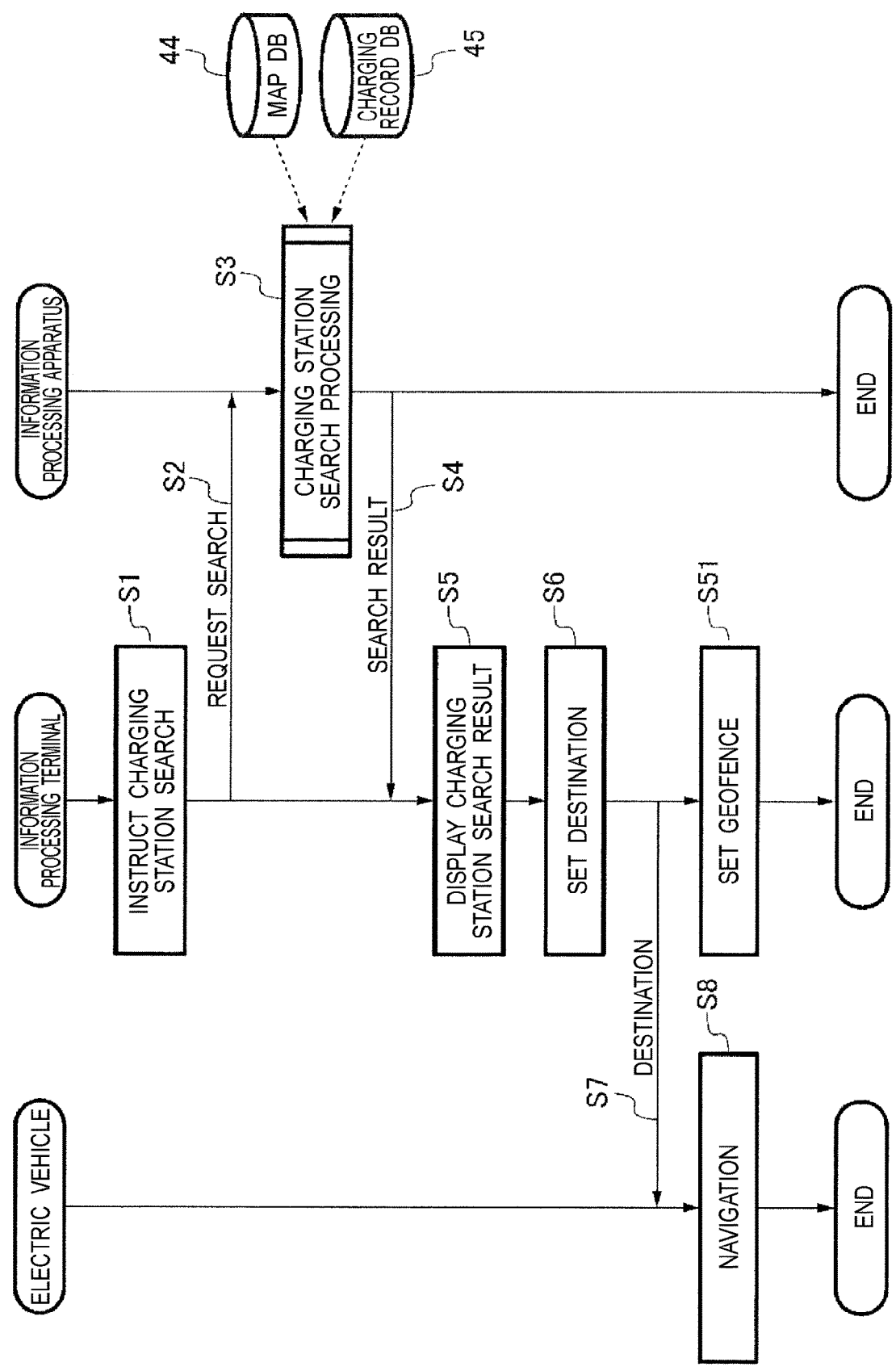
FIG. 13 is a flowchart showing a flow of processing between an electric vehicle, an information processing terminal, and an information processing apparatus when a search for a charging station is performed in the information processing system according to the third embodiment.

Next, the operation of the information processing system 301 will be described. First, the operation of the information processing system 301 when the driver of the electric vehicle 2 searches for a charging station using the information processing terminal 303 will be described with reference to FIG. 13. FIG. 13 is a flowchart showing a flow of processing between the electric vehicle 2, the information processing terminal 303, and the information processing apparatus 304 when a charging station is searched for using the information processing terminal 303. It should be noted that the information processing terminal 303 is premised to be in a state where the program 335 is activated.

Since steps S1 to S8 are the same as the steps of the first embodiment and the second embodiment, step S51 will be described.

When setting a charging station selected from among the search results as a navigation destination based on an input by the driver of the electric vehicle 2 (S6), the information processing terminal 303 sets a geofence around the location of the set charging station (S51). The geofence can be set within a range of a predetermined radius around the latitude and longitude indicating the location of the charging station stored in a map DB 44, for example.

Registration of Charging Record Information

Figure 14:
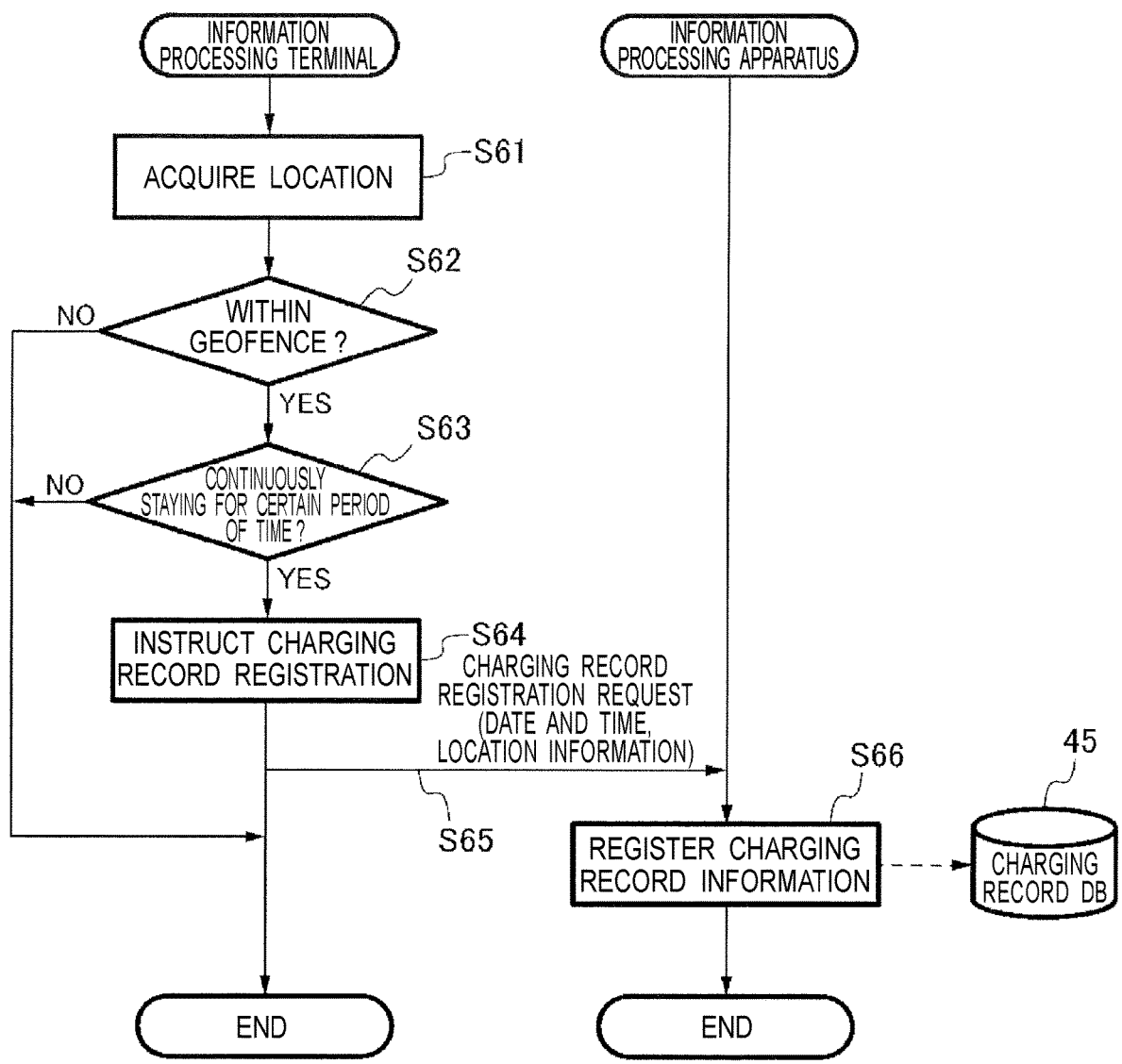
FIG. 14 is a flowchart showing a flow of processing between the information processing terminal and the information processing apparatus when charging record information is registered in the information processing system according to the third embodiment.

Next, an operation of the information processing system 301 when the information processing apparatus 304 registers the charging record information will be described with reference to FIG. 14. FIG. 14 is a flowchart showing a flow of processing between the information processing terminal 303 and the information processing apparatus 304 when the information processing apparatus 304 registers the charging record information. It should be noted that FIG. 14 shows the operation of the information processing system 301 at the timing when the information processing terminal 303 acquires the location information.

When acquiring the location of the information processing terminal 303 (S61), the information processing terminal 303 determines whether or not the information processing terminal 303 exists within the geofence set by the information processing terminal 303 based on the acquired location of the information processing terminal 303 (S62). If determining that the information processing terminal 303 exists within the set geofence (YES in S62), the information processing terminal 303 determines whether or not the information processing terminal 303 continuously stays within the geofence for a certain period of time based on the acquisition date and time of the location information (S63).

If determining that the information processing terminal 303 continuously exists within the geofence for the certain period of time (YES in S63), the information processing terminal 303 transmits an instruction to register the charging record information to the information processing apparatus 304 (S64). Thus, a charging record registration request including the location of the information processing terminal 303 and the upload date and time is transmitted to the information processing apparatus 304 (S65).

If determining that the information processing terminal 303 does not exist within the geofence (NO in S62) or determining that the information processing terminal 303 does not continuously exist within the geofence (NO in S63), the information processing terminal 303 ends the processing without transmitting the charging record registration request.

When receiving the charging record registration request, the information processing apparatus 304 generates charging record information based on the charging record registration request, and registers the generated charging record information in the charging record DB 45 (S66). More specifically, the information processing apparatus 304 sets the location of the information processing terminal 303 included in the charging record information registration request as the location of the charging record information, sets the upload date and time included in the charging record information registration request as the registration date and time, and generates the charging record information.

As described above, in the information processing system 301, the information processing terminal 303 sets the geofence to the charging station to be the destination. Based on its own location information, the information processing terminal 303 regards a case where the information processing terminal 303 continuously exists within the geofence for a certain period of time as a case where the electric vehicle 2 is charged, and registers and accumulates the charging record information. When receiving a search request for a charging station from the information processing terminal 303, the information processing apparatus 304 calculates an evaluation value using the charging record information, and displays the calculated evaluation value on the information processing terminal 303 as a search result. Therefore, according to the information processing system 301, it is possible to notify the charging station capable of charging the electric vehicle by a relatively simple method.

In the information processing system 301, the information processing apparatus 304 extracts only the charging record information corresponding to the evaluation point and the evaluation period from the charging station to be evaluated. Therefore, according to the information processing system 301, it is possible to provide an evaluation value with higher reliability.

MODIFIED EXAMPLE

Manual Evaluation

Similarly to the information processing system 1, the information processing system 301 of the third embodiment may also determine whether or not charging has been performed based on the manual evaluation of the driver of the electric vehicle 2 in addition to the determination shown in FIG. 14. For example, the information processing apparatus 304 may execute evaluation request processing when receiving the charging record registration request. The reliability of the evaluation value of the charging station can be further improved.

Electric Vehicle

The information processing system 301 according to the third embodiment uses the information processing terminal 303 as a component, but does not have to use the information processing terminal 303 as a component. That is, the electric vehicle 2 may have the above-described functions of the information processing terminal 303. In this case, the electric vehicle 2 has a function of requesting the information processing apparatus 304 to search for a charging station and displaying the search result of the charging station from the information processing apparatus 304, and a geofence function. In addition, when the information processing system 301 further includes the configuration of the above manual evaluation, the electric vehicle 2 has a function of evaluation input.

Other Embodiments

Combination of Embodiments

The first embodiment and the second embodiment may be combined. In addition, the first embodiment and the third embodiment may be combined. That is, if the information processing system determines that charging has been performed due to an increase in the cruisable distance of the electric vehicle 2 and determines that charging has been performed due to the determination of the location and the stay time of the electric vehicle 2 by the geofence function, the charging record information may be registered. Each configuration of the first embodiment, the second embodiment, and the third embodiment may be appropriately combined with each other and used.

Charging Record Information on Negative Evaluation in Which Charging has not Been Performed In the above embodiment, when the step of the determination processing based on the manual evaluation is added, the charging record information is registered only in the case of the positive evaluation in which it has been possible to perform charging, but the charging record information may be registered also in the case of the negative evaluation in which it has not been possible to perform charging. In this case, in the calculation of the evaluation value, the evaluation value may be calculated with the charging record information of the positive evaluation as an addition target and the charging record information of the negative evaluation as a subtraction target.

Although the embodiments of the present invention have been described above, the present invention is not limited to the above-described embodiments, and various modifications and changes can be made to the embodiments of the present invention without departing from the gist of the present invention, and configurations accompanied by such modifications and changes are also included in the technical scope of the present invention.

By the way, even if a user tries to charge a battery of an electric vehicle at a charging station, the electric vehicle may not be charged due to a failure of the charging station, for example.

For example to solve the above problem, an information processing apparatus of the present embodiment includes a map information storage unit, a charging record information storage unit, and an evaluation value calculation unit. The map information storage unit stores map information. The map information includes location information indicating the location of the charging station. The charging station is configured to be able to charge a battery of an electric vehicle. The charging record information storage unit stores charging record information. The charging record information indicates whether or not it has been possible to charge the battery. The evaluation value calculation unit calculates an evaluation value based on the charging record information.

According to the embodiment, it is possible to acquire an evaluation value indicating a charging station capable of charging an electric vehicle by a relatively simple method.

Obviously, numerous modifications and variations of the present invention are possible in light of the above teachings. It is therefore to be understood that within the scope of the appended claims, the invention may be practiced otherwise than as specifically described herein.

What is claimed is:

1. An information processing apparatus to be incorporated in an information processing system having an electric vehicle and an information processing terminal, the information processing apparatus comprising:
    a map information storage configured to store map information including a location of a charging station to charge a battery of the electric vehicle;
    a charging record information storage configured to store charging record information of said electric vehicle indicating whether or not it has been possible to charge the battery of said electric vehicle, the charging record information including a registered location of said electric vehicle where it has been possible to charge the battery for said electric vehicle at a charging station, and a registered date and time when it has been possible to charge the battery for said electric vehicle at said charging station;
    a processor;
    a receiver configured to receive a search request from the information processing terminal, the search request including a search condition of searching for the charging station,
    wherein the processor is programed to:
    search for the charging station from the map information storage meeting the search condition based on the map information to obtain candidate charging stations to be evaluated,
    acquire a first charging record information from the charging record information storage for the candidate charging stations searched from the map information storage corresponding to a predetermined evaluation period, the predetermine evaluation period being a predetermined period ranging from a date and time searched by the processor to a past, wherein in the first charging record information, the registered date and time for each candidate charging station is within the predetermined evaluation period, acquire a second charging record information corresponding to a predetermined evaluation point for each candidate charging station from the acquired first charging record information, the predetermined evaluation point being a predetermined range from the location of each candidate charging station stored in the map information storage, wherein in the second charging record information, the registered location of said electric vehicle for each candidate charging station is within the predetermined evaluation point, calculate an evaluation value for each station based on the acquired second charging record information corresponding to the evaluation period and the evaluation point, and output a charging station search result including the charging station searched by the processor and the evaluation value calculated by the processor to the information processing terminal, wherein the evaluation value is an index indicating possibility of charging at the charging station without experiencing a failure of the charging station, wherein the information processing apparatus is configured to control the electric vehicle through the information processing terminal by providing route guidance from a current location to a selected charging station within the charging station search result selected based on the evaluation value displayed in the charging station search result corresponding to the selected charging station.

2. The information processing apparatus according to claim 1, wherein the receiver receives information from the electric vehicle, the information including a charge amount of the battery or a navigable distance of the electric vehicle, and a location of the electric vehicle, and the processor is programed to generate the charging record information based on a date and time when the receiver has received the information and a location of the electric vehicle, and register the charging record information in the charging record information storage in a case where it is determined that the charge amount or the navigable distance has increased exceeding a predetermined threshold value.

3. The information processing apparatus according to claim 1, wherein the receiver receives location information including a location of the information processing terminal from the information processing terminal or receives location information including a location of the electric vehicle from the electric vehicle, and the processor is programed to generate the charging record information based on the date and time and a location indicated by the location information in a case where it is determined that the electric vehicle has continuously stayed in a region within a predetermined range from a location of the charging station for a predetermined time or more based on a date and time when the location information is received by the receiver and a location indicated by the location information received by the receiver, and register the charging record information in the charging record information storage.

4. An information processing system comprising:
an electric vehicle;
an information processing terminal; and
an information processing apparatus comprising:
  a map information storage configured to store map information including a location of a charging station to charge a battery of the electric vehicle;
  a charging record information storage configured to store charging record information of said electric vehicle indicating whether or not it has been possible to charge the battery of said electric vehicle, the charging record information including a registered location of said electric vehicle where it has been possible to charge the battery for said electric vehicle at a charging station, and a registered date and time when it has been possible to charge the battery for said electric vehicle at said charging station;
  a processor;
  a receiver configured to receive a search request from the information processing terminal, the search request including a search condition of searching for the charging station,
  wherein
  the processor is programed to:
  search for the charging station from the map information storage meeting the search condition based on the map information to obtain candidate charging stations to be evaluated,
  acquire a first charging record information from the charging record information storage for the candidate charging stations searched from the map information storage corresponding to a predetermined evaluation period, the predetermine evaluation period being a predetermined period ranging from a date and time searched by the processor to a past, wherein in the first charging record information, the registered date and time for each candidate charging station is within the predetermined evaluation period,
  acquire a second charging record information corresponding to a predetermined evaluation point for each candidate charging station from the acquired first charging record information, the predetermined evaluation point being a predetermined range from the location of each candidate charging station stored in the map information storage, wherein in the second charging record information, the registered location of said electric vehicle for each candidate charging station is within the predetermined evaluation point,
  calculate an evaluation value for each station based on the acquired second charging record information corresponding to the evaluation period and the evaluation point, and
  output a charging station search result including the charging station searched by the processor and the evaluation value calculated by the processor to the information processing terminal,
  wherein the evaluation value is an index indicating possibility of charging at the charging station without experiencing a failure of the charging station,
wherein the information processing apparatus is configured to control the electric vehicle through the information processing terminal by providing route guidance from a current location to a selected charging station within the charging station search result selected based on the evaluation value displayed in the charging station search result corresponding to the selected charging station, and wherein the electric vehicle includes a navigation device configured to guide a route from the current location with the selected charging station as a destination.

5. An information processing method comprising:

receiving a search request from an information processing terminal, the search request including a search condition of searching for a charging station meeting the search condition;

searching for a charging station from a map information storage meeting the search condition based on a map information to obtain candidate charging stations to be evaluated, wherein the map information is stored in a map information storage and includes a location of the charging station to charge a battery of an electric vehicle;

acquiring a first charging record information from a charging record information storage for the candidate charging stations searched from the map information storage corresponding to a predetermined evaluation period, wherein the charging record information storage is configured to store charging record information of said electric vehicle indicating whether or not it has been possible to charge the battery of said electric vehicle, the charging record information includes a registered location of said electric vehicle where it has been possible to charge the battery for said electric vehicle at a charging station, and a registered date and time when it has been possible to charge the battery for said electric vehicle at said charging station, and the predetermine evaluation period being a predetermined period ranging from a date and time searched by the processor to a past, wherein in the first charging record information, the registered date and time for each candidate charging station is within the predetermined evaluation period;

acquiring a second charging record information corresponding to a predetermined evaluation point for each candidate charging station from the acquired first charging record information, the predetermined evaluation point being a predetermined range from the location of each candidate charging station stored in the map information storage, wherein in the second charging record information, the registered location of said electric vehicle for each candidate charging station is within the predetermined evaluation point;

calculating an evaluation value for each station based on the acquired second charging record information corresponding to the evaluation period and the evaluation point;

outputting a charging station search result including the charging station searched by the processor and the evaluation value calculated by the processor; and controlling the electric vehicle through the information processing terminal by providing route guidance from a current location to a selected charging station within the charging station search result selected based on the evaluation value displayed in the charging station search result corresponding to the selected charging station, wherein the evaluation value is an index indicating possibility of charging at the charging station without experiencing a failure of the charging station.

6. A non-transitory storage medium storing a program causing a processor to implement receiving a search request from an information processing terminal, the search request including a search condition of searching for a charging station meeting the search condition;

searching for a charging station from a map information storage meeting the search condition based on a map information to obtain candidate charging stations to be evaluated, wherein the map information is stored in a map information storage and includes a location of the charging station to charge a battery of an electric vehicle;

acquiring a first charging record information from a charging record information storage for the candidate charging stations searched from the map information storage corresponding to a predetermined evaluation period, wherein the charging record information storage is configured to store charging record information of said electric vehicle indicating whether or not it has been possible to charge the battery of said electric vehicle, the charging record information includes a registered location of said electric vehicle where it has been possible to charge the battery for said electric vehicle at a charging station, and a registered date and time when it has been possible to charge the battery for said electric vehicle at said charging station, and the predetermine evaluation period being a predetermined period ranging from a date and time searched by the processor to a past, wherein in the first charging record information, the registered date and time for each candidate charging station is within the predetermined evaluation period;

acquiring a second charging record information corresponding to a predetermined evaluation point for each candidate charging station from the acquired first charging record information, the predetermined evaluation point being a predetermined range from the location of each candidate charging station stored in the map information storage, wherein in the second charging record information, the registered location of said electric vehicle for each candidate charging station is within the predetermined evaluation point;

calculating an evaluation value for each station based on the acquired second charging record information corresponding to the evaluation period and the evaluation point; and outputting a charging station search result including the charging station searched by the processor and the evaluation value calculated by the processor, wherein the evaluation value is an index indicating possibility of charging at the charging station without experiencing a failure of the charging station, and wherein the processor is configured to control the electric vehicle through the information processing terminal by providing route guidance from a current location to a selected charging station within the charging station search result selected based on the evaluation value displayed in the charging station search result corresponding to the selected charging station.

* * * * *